United States Patent
Fowler et al.

(10) Patent No.: US 6,212,474 B1
(45) Date of Patent: Apr. 3, 2001

(54) SYSTEM AND METHOD FOR PROVIDING ROUTE GUIDANCE WITH A NAVIGATION APPLICATION PROGRAM

(75) Inventors: Andrew Fowler, Chicago; Ankur Mittal, Lombard, both of IL (US)

(73) Assignee: Navigation Technologies Corporation, Rosemont, IL (US)

( * ) Notice: Subject to any disclaimer, the term of this patent is extended or adjusted under 35 U.S.C. 154(b) by 0 days.

(21) Appl. No.: 09/196,279

(22) Filed: Nov. 19, 1998

(51) Int. Cl.[7] .............................. G01C 21/34; G01C 21/26
(52) U.S. Cl. ........................ 701/211; 701/200; 701/207; 701/208; 701/213
(58) Field of Search .................................. 701/200, 201, 701/207–216; 713/150, 164, 172, 173, 174

(56) References Cited

U.S. PATENT DOCUMENTS

| | | | |
|---|---|---|---|
| 5,177,685 | * 1/1993 | Davis et al. ...................... | 701/209 X |
| 5,181,250 | 1/1993 | Morgan et al. . | |
| 5,283,575 | * 2/1994 | Kao et al. ........................ | 701/200 X |
| 5,592,665 | 1/1997 | Lahaije . | |
| 5,612,882 | * 3/1997 | LeFebvre et al. ................... | 701/209 |
| 5,784,691 | 7/1998 | Ruhl . | |
| 5,806,035 | 9/1998 | Zeegers et al. . | |
| 5,808,566 | * 9/1998 | Behr et al. ....................... | 701/208 X |

FOREIGN PATENT DOCUMENTS

| | | |
|---|---|---|
| 0 838 663 A2 | 4/1998 | (EP) . |
| 08159801 | * 6/1996 | (JP) . |
| 09044791 | * 2/1997 | (JP) . |

OTHER PUBLICATIONS

Hoffman, Steve and Stewart, Charles, "Text–based Routing: An Affordable Way Ahead?", Proceedings of the IEEE–IEE Vehicle Navigation & Information System Conference, Ottawa, Canada—VNIS 1993.

* cited by examiner

Primary Examiner—Bernarr E. Gregory
(74) Attorney, Agent, or Firm—Frank J. Kozak; Lawrence M. Kaplan

(57) ABSTRACT

A route guidance program and method are disclosed. Maneuver data structures are formed that include data from a geographic database for each location along a route at which a maneuvering instruction is to be provided. These maneuver data structures are used to form a list of tokens. A token can be either a character string or a symbol that refers to another item of data, which can be either a character string, audio data, or graphics data. Maneuvering instructions are provided by explicating the tokens in the list of tokens. Explicating the tokens is done by providing all the data contained in or referred to by the tokens in the order specified in the list of tokens. If the token is a character string, explication includes providing the character string data contained in the token. If the token is a symbol, explication includes providing the data referred to by the symbol, which can be either a character string, audio data, or graphics data. The list of tokens is built by combining sequences of tokens. A sequence of tokens is formed for each of the maneuver data structures. Each sequence of tokens is formed from a output list formed by application of a rules set to the data in the respective maneuver data structure. The contents of an output list for a maneuver data structure can include symbols and keys. Symbols in an output list are used to form tokens which are included in the sequence of tokens formed for that maneuver data structure. Keys in an output list refer to data in the corresponding maneuver data structure. Keys expanded to form tokens which are included in the sequence of tokens formed for that maneuver data structure.

17 Claims, 11 Drawing Sheets

SYSTEM AND METHOD FOR PROVIDING ROUTE GUIDANCE WITH A NAVIGATION APPLICATION PROGRAM

BACKGROUND OF THE INVENTION

The present invention relates to a system and method for providing route guidance information to an end-user of a navigation application program.

Computer-based navigation application programs are available that provide end-users with various navigating functions and features. Some computer-based navigation application programs are included in navigation systems installed in vehicles, such as automobiles, trucks, buses, and so on. These in-vehicle systems can provide end-users, such as drivers of the vehicles in which the navigation systems are installed, with various navigating functions. For example, some navigation application programs are able to determine an optimum route to travel by roads between locations in a geographic region. Using input from an end-user, and optionally from equipment that can determine one's physical location (such as a GPS system), a navigation application program can examine various routes between two locations to determine an optimum route to travel from a starting location to a destination location in a geographic region. The navigation application program may then provide the end-user with information about the optimum route in the form of instructions that identify the maneuvers required to be taken by the end-user to travel from the starting location to the destination location. The instructions may take the form of visual and/or audio instructions that are provided along the way as the end-user is traveling the route. Some navigation application programs are able to show detailed maps on computer displays outlining routes to destinations, the types of maneuvers to be taken at various locations along the routes, locations of certain types of features, and so on.

In addition to in-vehicle navigation systems, computer-based navigation application programs are also provided on various other kinds of computer hardware platforms and with other kinds of computer architectures. For example, navigation application programs may be provided on personal computers, including desktop computers and portable computers. Computer-based navigation application programs may also be provided on networks, including wireless networks and the Internet. Computer-based navigation application programs may also be included on hand-held computer devices, such as personal digital assistants, telephones, pagers, and so on. In addition, computer-based navigation application programs may be included on special purpose electronic devices, such as personal navigation systems.

In order to provide these and other navigating functions, the navigation application program uses geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation application programs provide many important features, there continues to be room for improvements. One area in which there is room for improvement relates to providing meaningful maneuvering information to the end-user. For example, when a navigation application program provides maneuvering instructions to the end-user, it may be helpful to provide information about the names of the roads involved in the maneuver (e.g., "At the upcoming intersection with First Street, turn slightly to the right to stay on Main Street"). However, some roads are unnamed. Accordingly, in order to provide more meaningful maneuvering instructions that include more detail, it is necessary to take into account the availability, quality, and type of information which is available about the represented physical geographic features.

Another example of an area in which there is room for improvement relates to providing maneuvering instructions in different languages. For example, one person driving a rental automobile with a navigation system may want to have audible maneuvering instructions provided in English. Another driver of the same rental automobile may want to have the navigation system provide audible maneuvering instructions in Spanish. Alternatively, another driver of the same rental automobile may want to have the maneuvering instructions provided by the navigation system as text in English with graphics on a display monitor. Therefore, it would be beneficial to be able to accommodate the preferences of each of these different drivers with the same navigation system in the same automobile while still providing maneuvering instructions that are detailed and meaningful.

Another consideration relates to providing route guidance features on a navigation application program being run on a personal computer. If the end-user is running a navigation application from a personal computer, he/she may want to have the maneuvering instructions printed out or saved to a disk file for later use. In this situation, the maneuvering instructions need to be rendered and formatted appropriately for printing, or in a usable file format.

Other considerations apply if the navigation application program is operated from a hand-held computing device, such as a personal digital assistant. In this situation, the end-user may want to have the maneuvering instructions provided on a display screen of the device. If the navigation application program is provided via a telephone, the end-user may want to have the maneuvering instructions provided audibly as a voice message or on a display screen of the telephone.

Because there are different ways that end-users may want to have maneuvering instructions provided to them, it is preferable that there be different ways to render the maneuvering instructions. However, because these different kinds of devices have different capabilities and user interfaces, it has been difficult to provide a navigation application program that provides meaningful route guidance features that can accommodate all these different kinds of devices.

Accordingly, there is need for a program that facilitates the delivery of meaningful information to an end-user of a navigation application program.

A further area in which there is need for improvement relates to provision of a universal route guidance module or tool that can be readily used in a variety of different software and hardware environments and platforms without the need for extensive revisions and customizations.

SUMMARY OF THE INVENTION

To achieve the foregoing and other objectives, a method and system have been invented that provide improved route guidance with a navigation application program. Maneuver data structures are formed that include data from a geographic database for each location along a route at which a maneuvering instruction is to be provided. These maneuver data structures are used to form a list of tokens. A token can be either a character string or a symbol that refers to another item of data, which can be either a character string, audio data, or graphics data. Maneuvering instructions are provided by explicating the tokens in the list of tokens. Explicating the tokens is done by providing all the data contained in or referred to by the tokens in the order specified in the list of tokens. If the token is a symbol, explication includes providing the data referred to by the symbol, which can be either a character string, audio data, or graphics data. The list of tokens is built by combining sequences of tokens formed for each maneuver data structure. Each of the sequences of tokens is formed from a respective output list formed by application of a rules set to the data in the maneuver data structure. The contents of an output list for a maneuver data structure can include symbols and keys. Symbols in an output list are used to form tokens which are included in the sequence of tokens formed for that maneuver data structure. Keys in an output list refer to data in the corresponding maneuver data structure and are expanded to form tokens which are included in the sequence of tokens formed for that maneuver data structure.

DETAILED DESCRIPTION OF THE PRESENTLY PREFERRED EMBODIMENTS

I. EXEMPLARY NAVIGATION SYSTEM PLATFORM/ENVIRONMENT

Figure 1:
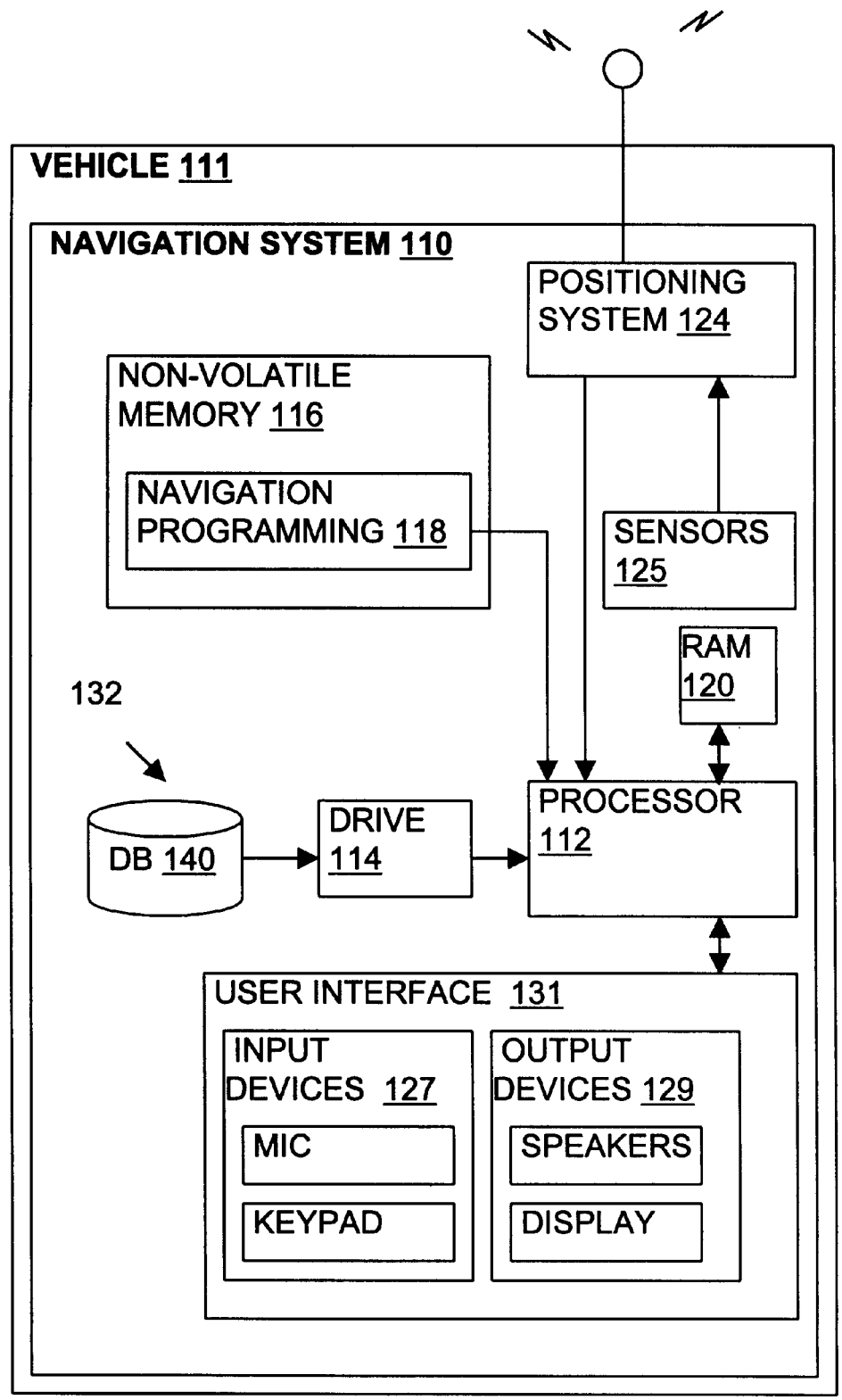
FIG. 1 is a block diagram illustrating a navigation system.

Referring to FIG. 1, there is a diagram illustrating an exemplary embodiment of a navigation system 110. The navigation system 110 is a combination of hardware and software components. The hardware components of the navigation system 110 may include a processor 112, memory 120, and so on.

The navigation system 110 may be stationary or portable. In the embodiment shown in FIG. 1, the navigation system 110 is a portable system located in a vehicle 111, such as an automobile, truck, or bus. In other embodiments, the navigation system 110 may be installed in other platforms, as explained below.

In the embodiment of FIG. 1, the navigation system 110 also includes a positioning system 124 that determines the position of the vehicle 111 in which it is installed. The positioning system 124 may include sensors 125 or other components that sense the speed, orientation, direction, and so on, of the vehicle 111. The positioning system 124 may also include a GPS system.

The navigation system 110 also includes a user interface 131. The user interface 131 includes appropriate means 127 for receiving instructions and/or input from an end-user of the navigation system. For example, the user interface 131 may include an input panel, keyboard, microphone, voice recognition software, and so on, through which the end-user may request navigation information. The user interface 131 also includes appropriate means 129 for providing information back to the end-user. The user interface 131 may include a display or speakers (including speech synthesis hardware and software) through which the end-user can be provided with information from the navigation system 110.

All of the components described above may be conventional (or other than conventional) and the manufacture and use of these components are known to those of skill in the art. For example, the processor 112 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

II. GEOGRAPHIC DATABASE

In order to provide navigation features to an end-user, the navigation system 110 uses geographic data 140. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location. In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed.

In one embodiment, the storage medium 132 is a CD-ROM. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may be in the form of one or more computer-readable data files or databases. The geographic data 140 includes information about the roads and intersections in or related to one or more geographic regions or coverage areas. This information includes data specifying the positions of the roads in the covered geographic region and also includes data about features relating to the roads, such as restrictions on directions of travel on the roads (e.g., one-way streets), turn restrictions, street addresses, street names, speed limits, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 140 may include other data about the geographic region.

The geographic data 140 may take a variety of different forms. In one embodiment, the geographic data 140 includes a plurality of road segment data entities. Each road segment data entity represents a portion (or segment) of a navigable road in the geographic region. Each physical road segment has two nodes associated with it, one at each of the endpoints of the road segment. In this embodiment, the geographic data 140 also includes a plurality of data entities that represent these nodes. Each node data entity identifies the position (e.g., geographic coordinates) of one of the nodes at the end of a road segment. In one embodiment, the geographic data are provided by Navigation Technologies Corporation of Sunnyvale, Calif., however it is understood that data developed and provided by other entities may also be suitable for use with the inventive subject matter disclosed herein.

III. THE NAVIGATION PROGRAMMING
A. OVERVIEW OF THE NAVIGATION PROGRAMMING

In addition to the hardware components and geographic database, the navigation system 110 includes or uses navigation programming 118. The navigation programming 118 includes the software that provides for the functions and/or features performed by the navigation system 110. The navigation programming 118 uses the geographic data 140 in conjunction with input from the user interface 131, and possibly in conjunction with outputs from the positioning system 124, to provide various features and/or functions.

The navigation programming 118 may be stored in a non-volatile storage medium 116 in the navigation system 110. Alternatively, the navigation programming 118 and is the geographic data 140 may be stored together on a single storage device or medium. Alternatively, the navigation programming 118 may be located at a remote location and may be provided to or accessed by the navigation system 110 over a communications system.

Figure 2:
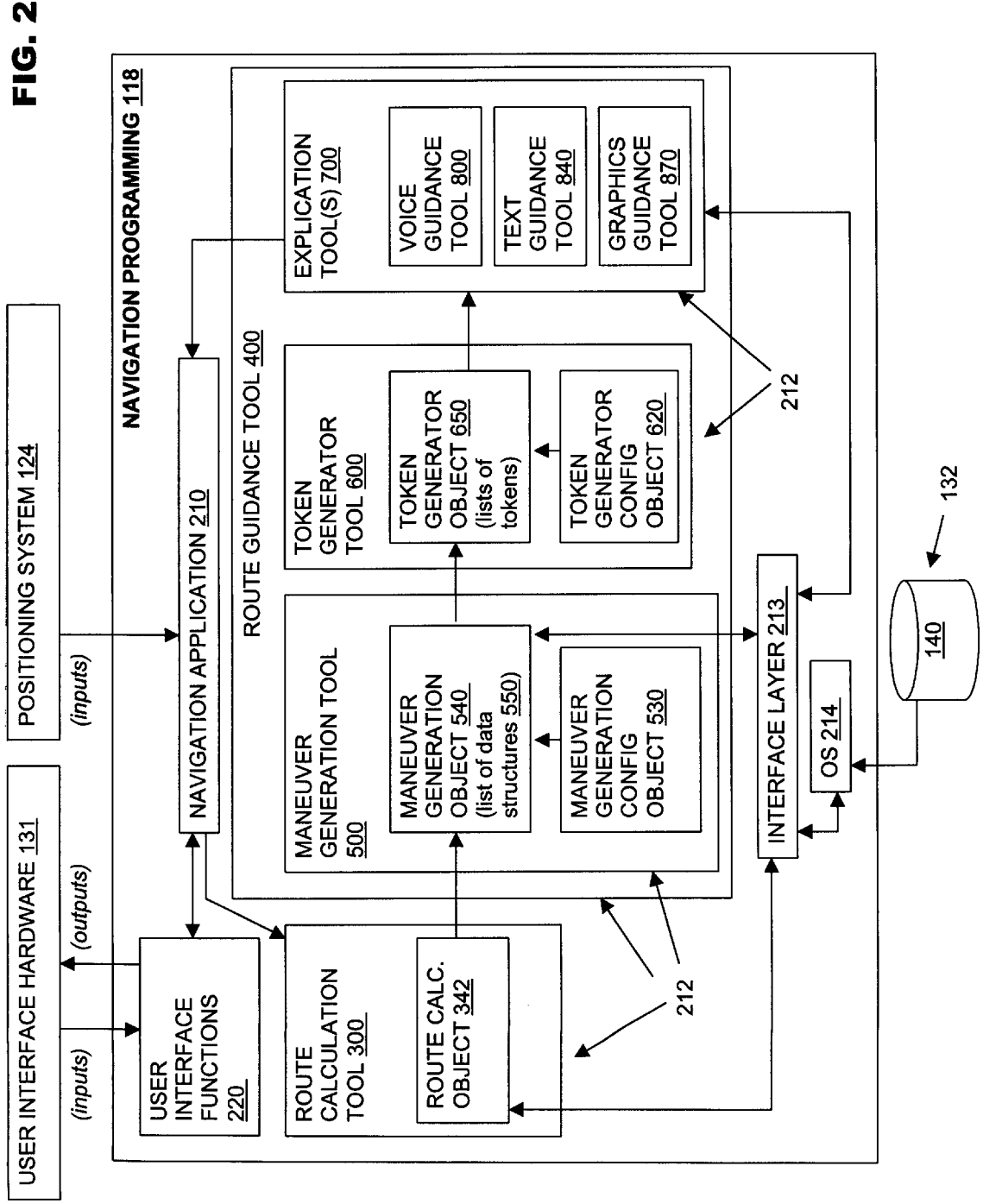
FIG. 2 is a block diagram illustrating components of the navigation application program of FIG. 1.

The navigation programming 118 may be formed of separate component applications (also referred to as programs, subprograms, routines, or tools). The component applications of the navigation programming 118 may work together through defined programming interfaces. FIG. 2 shows a block diagram illustrating some of the component applications for one embodiment of the navigation programming 118 included in the navigation system 110 of FIG. 1. FIG. 2 shows only a portion of all the component applications that make up the navigation programming 118. Other component applications, programs or tools may be included in the navigation programming 118.

In the embodiment shown in FIG. 2, the navigation programming 118 is shown to include a navigation application 210 and one or more navigation tools 212. The navigation application 210 is a program or routine that provides for overall management of the functions of the navigation system 110. The navigation application 210 may also include support for and interfaces to the navigation system hardware, such as the positioning system 124 and the user interface 131. For this purpose, the navigation application 210 shown in FIG. 2 includes user interface functions 220. These user interface functions 220 may provide for presenting a menu to the end-user on a screen display of the user interface hardware 131, accepting inputs from the end-user via the user interface hardware 131, displaying results to the end-user on a screen display of the user interface hardware 131, and so on.

The navigation tools 212 are programs that provide for specific navigation functions to the performed by the navigation programming 118. In the embodiment of FIG. 2, the navigation tools 212 are programs that provide for functions that use the geographic data 140. The features or functions provided by the navigation tools 212 may include route calculation, map display, route guidance, and other features. The navigation tools 212 receive requests for navigation information from the navigation application 210. The navigation tools 212 request and obtain data from the geographic database 140 and use the data to satisfy the requests for navigation information from the navigation application 210. The navigation tools 212 may obtain the geographic data directly from the geographic database 140 on the medium 132 or alternatively, the navigation tools 212 may obtain the data through an interface layer 213 and an operating system 214.

In one present embodiment, the navigation tools 212 are provided as modules that are relatively portable and that can be incorporated into different kinds of navigation programs, systems and/or platforms. Each navigation tool may be compiled together with the navigation application 210 and any other navigation tools to form a single executable program which is stored on the non-volatile medium 116. Alternatively the navigation tools may be used as one or more standalone programs. In a preferred embodiment, the navigation tools employ an object-oriented approach to their programming, use of data, and relationship to the navigation application 210. Each navigation tool is formed of one or more objects, each of which receives input data and generates output data according to a predefined function and each of which may invoke methods on other objects. In one present embodiment, each object has its own private memory that is opaque to other objects. In the disclosed embodiment, an object may be used to convey data from one object to another object or may be used to transform data received as input. In one embodiment, the navigation tools 212 are written in the C programming language although in alternative embodiments other programming languages may be used, such as C++, Java, Visual Basic, and so on.

B. THE ROUTE CALCULATION TOOL

In the embodiment of FIG. 2, route calculation functions are performed by the route calculation tool 300. The route calculation tool 300 determines a route between specified locations. The route calculation tool 300 receives input in the form of data that identify at least an origin and a desired destination. The route calculation tool 300 may receive additional input information that affects the calculation of the route. For example, the input to the route calculation tool 300 may include data that specify user preferences such as avoidance of toll roads or expressways, and so on. The input may also include data that identifies the time of day at which the route will be started which may affect the route calculation.

In the embodiment of FIG. 2, the route calculation tool 300 receives its input from the navigation application 210. In the navigation application 210, the user interface functions 220 receive input from the user interface 131. The input may include a request from the end-user for a route to be calculated to a desired destination. The navigation application 210 may also receive information from the positioning system 124 indicating a position of the vehicle 111. The information from the positioning system 124 is used by the navigation application 210 to determine a present position of the vehicle 111. Alternatively, the end-user may specify a starting location for the route. Using these inputs, data that identify the locations of an origin and a destination are determined. This function may be provided by programming included in the navigation application 210 that then passes these data to the route calculation tool 300. Alternatively, this function may be provided by another navigation tool, such as a geo-coding tool, which interfaces with the navigation application 210 and route calculation tool 300.

Given data that identify the positions of an origin and destination, the route calculation tool 300 calculates a route between the origin and the destination. The route calculation tool 300 may use various means or algorithms for this purpose. Methods for calculating routes are disclosed in Ser. No. 09/047,698, filed Mar. 25, 1998, the entire disclosure of which is incorporated by reference herein. (The methods disclosed in the aforementioned patent application represent only some of the ways that routes can be calculated and the claimed subject matter of the present patent is not limited to any particular method of route calculation. Any suitable route calculation method now known or developed in the future may be employed.)

Figure 3:
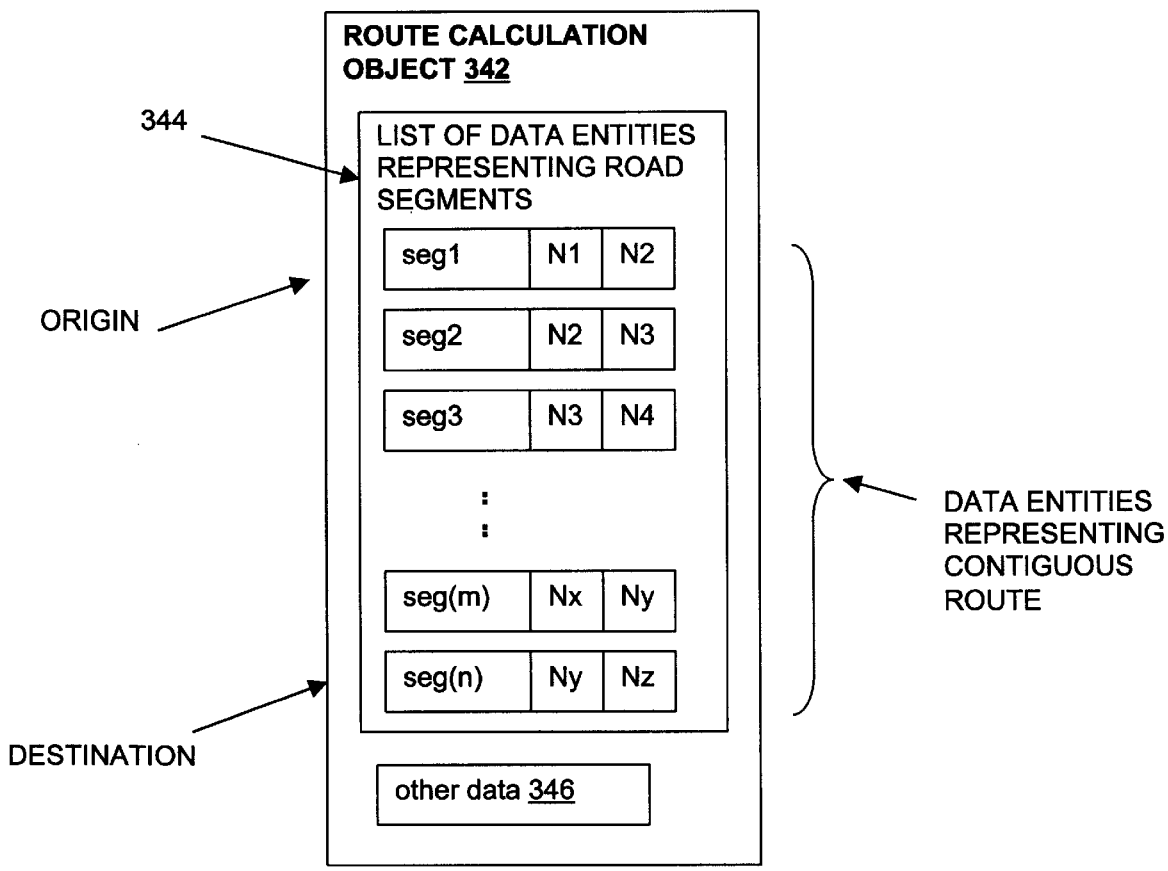
FIG. 3 is a diagram illustrating the components of the route calculation object of FIG. 2.

The route calculation tool 300 provides an output. In the embodiment of FIG. 2, the output of the route calculation tool 300 is in form of a route calculation object 342. FIG. 3 is a diagram representing the components of the route calculation object 342. The route calculation object 342 contains an ordered list 344 identifying a plurality of road segment data entities (i.e., seg1, seg2, seg3 . . . seg(n)). The plurality of data entities represent the road segments that form the continuous navigable route between the origin and the destination that had been calculated by the route calculation tool 300. Since these segments form a continuous route, each segment shares a node with its successor segment in the list. For example, as shown in FIG. 3, the segments "seg2" and "seg3" are shown to have a common node "N3." The route calculation object 342 may include other information 346 in addition to the ordered list of road segment data entities.

In a present embodiment, the route calculation object 342, which is created by the route calculation tool 300, is used as an input to the route guidance tool 400. The route guidance tool 400 uses the data in the route calculation object 342, in conjunction with additional information from the geographic database 140, to return navigation information to the navigation application 210. The data returned by the route guidance tool 400 to the navigation application 210 may be sent directly to the user interface functions 220 for presentation to the end-user via the user interface hardware 131. Alternatively, the data returned by the route guidance tool 400 to the navigation application 210 may be further processed by programming in the navigation application 210. The presentation of information to the end-user via the user interface hardware 131 may be in the form of audible instructions, visual textual instructions, visual graphical instructions, or any combinations of these or other types of information presentation.

C. ROUTE GUIDANCE TOOL/MANEUVER GENERATION TOOL

Referring again to FIG. 2, the route guidance tool 400 is comprised of three navigation tools: a maneuver generation tool 500, a token generator tool 600, and an explication tool 700. In a present embodiment, these navigation tools have the properties of tools, as described above.

The maneuver generation tool 500 uses as its input the route calculation object 342 formed by the route calculation tool 300. (Methods for providing the functions performed by the maneuvering generation tool 500 are disclosed in the co-pending patent application, Ser. No. 08/893,201, filed Jul. 15, 1997, the entire disclosure of which is incorporated by reference herein. The maneuver generation tool describe herein is similar to the subject matter disclosed in the referenced application, except as noted below.)

The maneuver generation tool 500 performs at least two functions. The maneuver generation tool 500 uses the information in the ordered list of segment data entities 344 in the route calculation object 342 to determine which locations along the calculated route should be explicated to the end-user with a maneuvering or advisory instruction. In addition, for each of the locations determined as requiring explication, the maneuver generation tool 500 collects information needed to provide a maneuvering or advisory instruction for the particular location.

Figure 4:
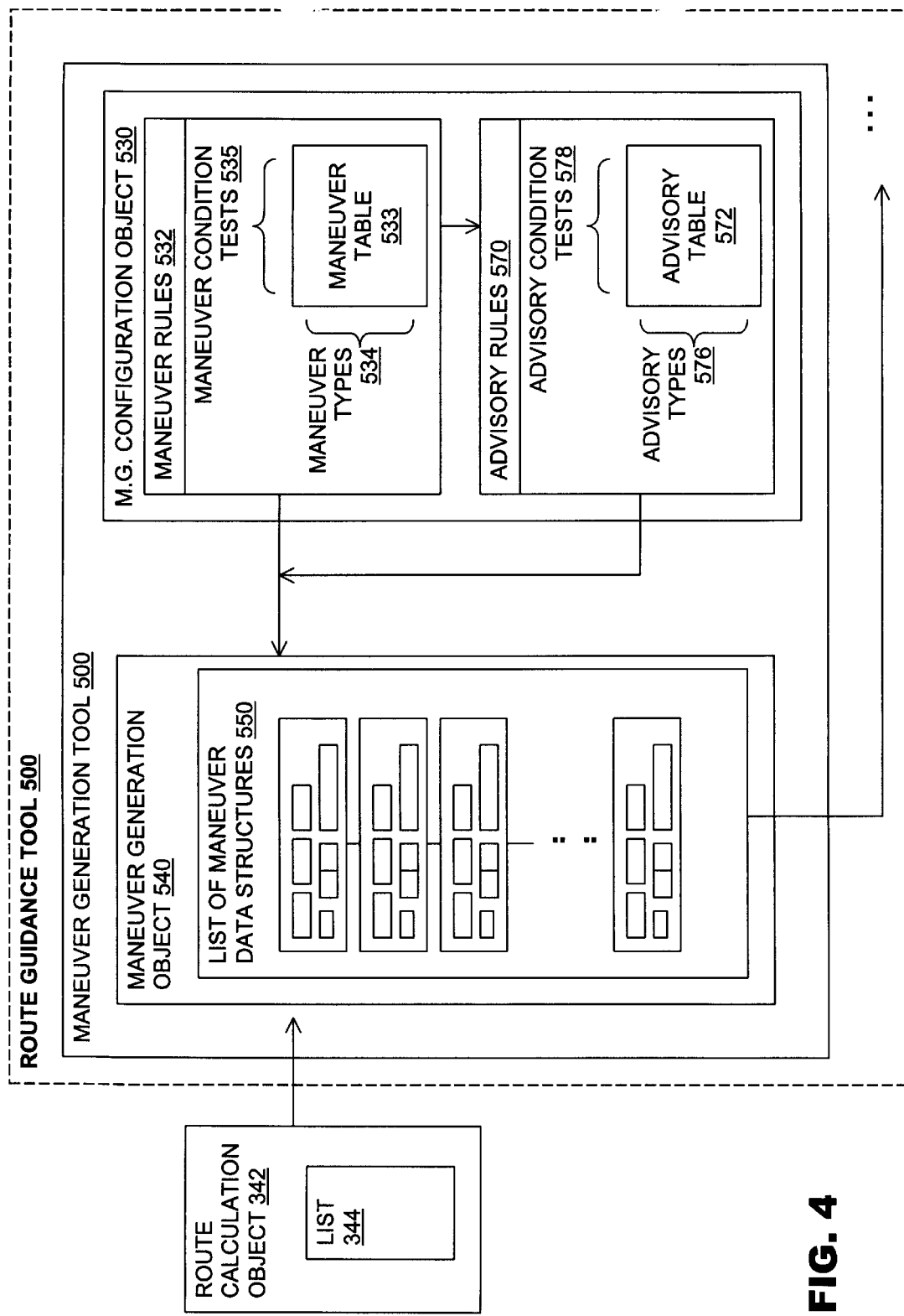
FIG. 4 is a diagram illustrating the components of the maneuver generation tool of FIG. 2.

In performing these functions, the maneuvering tool 500 uses two objects. Referring to FIG. 4, the maneuver tool 500 includes a (maneuver generation) configuration object 530 and maneuver generation object 540. The (maneuver generation) configuration object 530 contains maneuver rules 532. These maneuver rules 532 are applied using the data in the route calculation object 342 and from the geographic database 140. These rules determine when a location along the calculated route should be explicated with a maneuvering instruction. As mentioned above, the route calculation object 342 contains the list 344 of data entities that represent segments of roads. Because this list represents road segments that form a continuous route, each road segment represented by a data entity in the list 344 shares a node (i.e., an "endpoint") with a road segment represented by an adjacent data entity in the list. The maneuver rules 532 are applied at each of these nodes in the list 344.

In applying the maneuver rules 532, the direction of travel of the calculated route is taken into account. Thus, the segment by which the calculated route leads into the node being tested by the maneuver rules 532 is identified as the entry segment. The segment by which the calculated route leads out of the node being tested by the maneuver rules 532 is identified as the exit segment. In addition, all the other road segments that are not part of the calculated route, but that share this same node with the entry and exit segments are identified. The data entities that represent all these road segments are obtained from the database 140.

The maneuver rules 532 are provided in the form of a table 533. (An example of a table containing maneuver rules is included at Table 1 in the Appendix.) The table 533 defines a plurality of maneuver types 534 and a plurality of maneuver condition tests 535. Each of these maneuver types 534 characterizes a particular kind of roadway configuration change that can occur at the node being tested from the calculated route. Each maneuver type 534 is assigned a unique code or number.

Each of the maneuver condition tests 535 is formulated to accept only a positive or negative answer. Each maneuver type 534 defined in the table 533 is associated with a unique subset of the plurality of maneuver condition tests 535. Each maneuver condition test 535 uses the data in the data entities which had been obtained from the database 140 (such as the data associated with the entry segment, the exit segment, the accessible and inaccessible segments, and so on) to ascertain whether the condition specified in the maneuver condition test is satisfied. For each node in the calculated route 344, if all the maneuver condition tests associated with a maneuver type 534 are satisfied, a maneuver instruction is required for that the node location.

For each of the locations determined by the maneuvering tool 500 as requiring explication, the maneuvering tool 500 forms a maneuver data structure 550 and adds the maneuver data structure to the maneuver generation object 540. Each maneuver data structure 550 formed by the maneuver generation tool 500 contains the information needed to provide a maneuvering instruction to the end-user at the location along the route at which explication has been determined to be provided to the end-user. Some of the data required for the maneuver data structure is included in or derived from the segment data entities that were tested to determine whether a maneuvering instruction is required at the location of the node. Additional data may be required to be obtained or derived from the database 140 by the maneuver generation configuration object.

Figure 5:
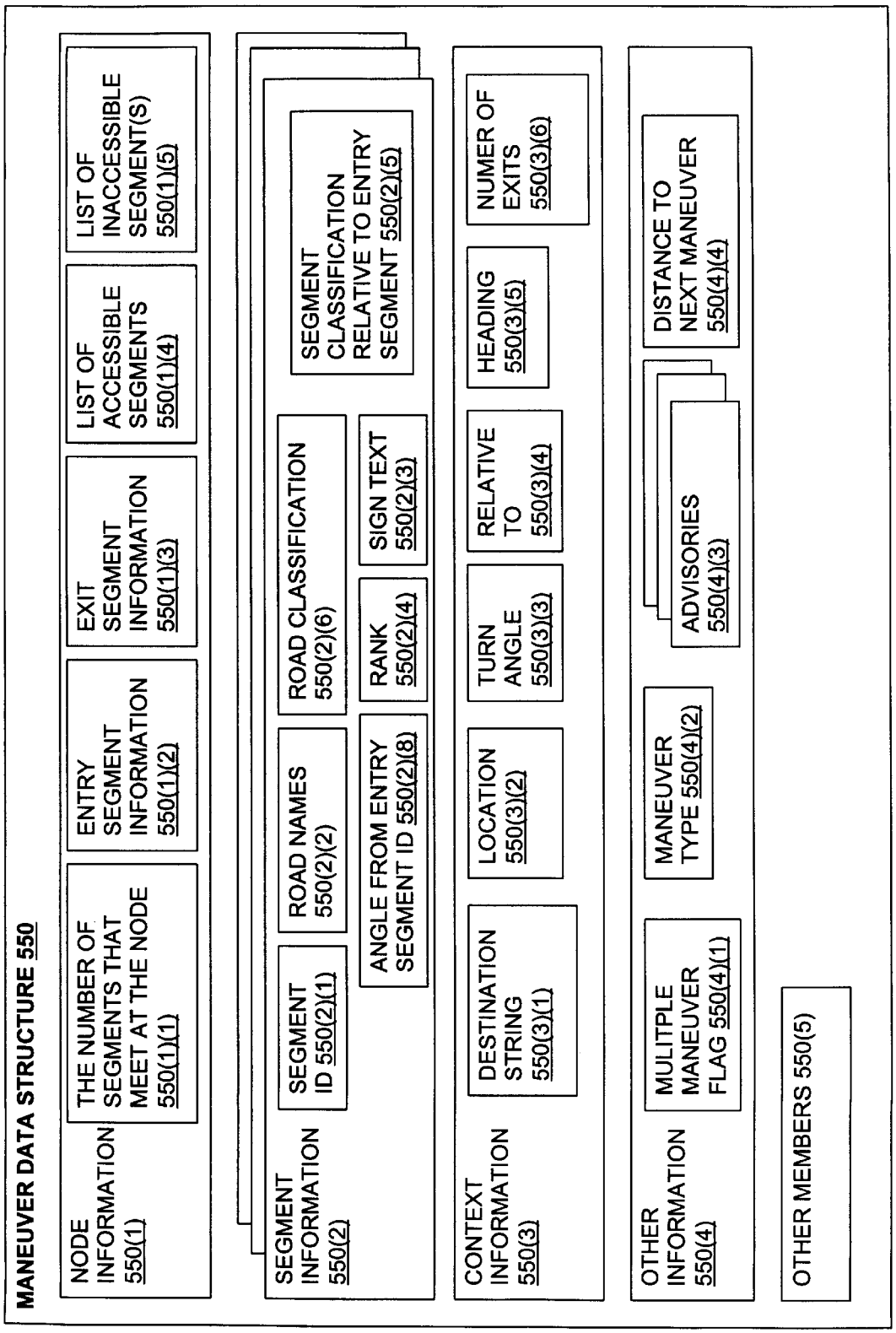
FIG. 5 is a diagram illustrating the component members of one of the maneuver data structures of FIG. 4.

FIG. 5 shows the kinds of data contained in each maneuver data structure 550. In one embodiment, the maneuver data structure 550 is formed as a C data structure. Using data from the segment data entities that share the node associated with the maneuver, as well as any additional data needed or derived from the geographic database, the maneuver generator object 540 collects data corresponding to the various members of the maneuver data structure 550. Data are collected to the extent they are available. Members of the data structure may be left empty if there is no data available (e.g., if one of the roads at a maneuver location is unnamed).

Included in the data structure 550 is a field 550(1)(1) that identifies the number of segments that meet at the node. The entry and exit segments 550(1)(2), 550(1)(3) into the node are identified. In addition, any accessible segments 550(1)(4) that share the node are identified and any inaccessible segments 550(1)(5) that share the node are identified. For each of the segments (entry, exit, accessible, and inaccessible), the data structure 550 provides for identifying the segment database identification (a DBID) 550(2)(1), the name(s) of the segment (if any) 550(2)(2), sign(s) on the segment (if any) 550(2)(3), the rank of the segment 550(2)(4), the segment classification relative to the entry segment (exit, accessible, inaccessible) 550(2)(5), the database classification of the segment (e.g., controlled access, street, ramp) 550(2)(6), and the angle of the segment relative to the entry segment 550(2)(8). In addition, the data structure 550 also includes a field that can be used to identify the maneuver type (as described above) 550(4)(2), the distance to the next maneuver 550(4)(4), and whether the maneuver is included in a multiple maneuver 550(4)(1). (A multiple maneuver may be defined by the maneuver generator object when a location at which a maneuvering instruction is determined to be required is so close to an another adjacent location at which a maneuvering instruction is determined to be required that it may be preferable to present the two, or more, maneuver instructions to the end-user at the same time. The distance at which a multiple maneuver is defined is configurable and may be a function of various factors, including speed limits along the road segments, distance, rank, and so on.)

The data structure may also include fields for providing context information 550(3) for the exit road. This kind of information may be useful when the other information in the maneuver structure is not sufficient to describe the exit fully, such as when the exit segment is unnamed. The fields for context information may include a destination string 550(3)(1) which describes the exit of the maneuver in cases where the exit segment name is not sufficient (such as when it is unnamed). The context information 550(3) may also include a field for a "location" 550(3)(2) which gives the location of the exit relative to another road (e.g., before, after, ahead, behind, on the right, or on the left). The context information 550(3) may also include a field for a "turn angle" 550(3)(3) which gives the angle to be taken to go onto the exit road. The context information may also include a field for a "heading" 550(3)(5) which can be used during the starting-off maneuver and provides the initial heading to be taken (e.g., north, south, east, west, northwest, etc.) The context information 550(3) may also include a field for "relative to" 550(3)(4). The "relative to" field 550(3)(4) is meant to be used in a starting off maneuver. The "relative to" field 550(3)(4) gives an initial intersection to be traveled toward. It can also used in cases where the exit segment is unnamed (e.g., "turn right after Main Street"). The context information 550(3) may also include a field for "number of exits" 550(3)(6) which can be used for roundabout maneuvers. This "number of exits" field 550(3)(6) includes the number of exits to be passed traveling along a roundabout before reaching the desired exit.

In addition to the members mentioned above, the maneuver data structure 550 may include additional members 550(5).

The maneuver data structure also includes information for providing advisories. Advisories are types of useful explication information that are not necessarily associated with a maneuver. Advisories may be provided when there is a change in the road network, but a specific driving maneuver is not required. For example an advisory may be provided when entering or leaving a bridge or a tunnel. The maneuver data structure 550 includes a field that includes a listing 550(4)(3) of one or more advisory types. Referring again to FIG. 4, in addition to the maneuver rules 532 which are used for determining whether to explicate a maneuver at a particular node and forming the data structures 550 therewith, the maneuver configuration object 530 also includes advisory rules 570. The advisory rules 570 are applied to each of the nodes in the route calculation object 342. Like the maneuver rules 532, the advisory rules 570 are in the form of a table 572. (An example of a table containing advisory rules is included at Table 2 in the Appendix.) The advisory rules table 572 includes a set of advisory types 576 and a set of advisory condition tests 578. Each advisory type 576 characterizes a particular kind of advisory that can be provided at a node. Each advisory type 576 is assigned a unique code or number. Each of the advisory condition tests 578 is formulated so as to permit only positive and negative results. A unique subset of the advisory condition tests 578 is associated with each different advisory type 576. If positive results are obtained for all the advisory condition tests associated with an advisory type 576, that advisory type 576 is associated with the maneuver at that location.

Unlike the rules for maneuvers, the rules for advisories do not require a unique result. Thus, for a given location along a route, there may be one advisory type, multiple advisory types, or no advisory type. The number or code for each advisory type 576 is included in the data structure 550 formed for that location.

The application of the advisory rules is independent of the application of the maneuver rules. Thus, application of the advisory rules can require that an advisory instruction be provided at a location along a route even if the application of the maneuver rules at the same location does not require that a maneuvering instruction be provided. If application of the advisory rules requires that an advisory instruction be provided at a location, but application of the maneuver rules at the same location does not require that a maneuvering instruction be provided, a maneuver data structure is formed for that location containing data for the members of the data structure to the extent the data are available. A maneuver data structure formed for such a location would have a maneuver type of "0."

The maneuver generation configuration object 540 traverses the list 344 of data entities in the route calculation object 342 so that each node along the calculated route is tested with the maneuver rules 532. A maneuver data structure 550 having information for each of the fields identified above (to the extent such information is available) is formed for each location in the calculated route at which the all the maneuver condition tests for any of the maneuver types or all the advisory condition tests for any of the advisory types are satisfied. The maneuver data structures 550 formed by this process are contained in order in the maneuver generation object 540.

D. ROUTE GUIDANCE TOOL/TOKEN GENERATOR TOOL (1) Overview

Referring again to FIG. 2, the token generator tool 600 uses as its input the maneuver generation object 540 formed by the maneuver generation tool 500. The token generator tool 600 includes a (token generator) configuration object 620 and a token generator object 650. Using the information in the list of data structures 550 in the maneuver generation object 540, the token generator object 650 forms a token list. In turn, the token generator object 650 is used by the explication tool 700 (or one or more of the tools included therein) to form maneuvering instructions that are returned to the navigation application 210 in order to explicate the route calculated by the route calculation tool 300 to the end-user.

Figure 6:
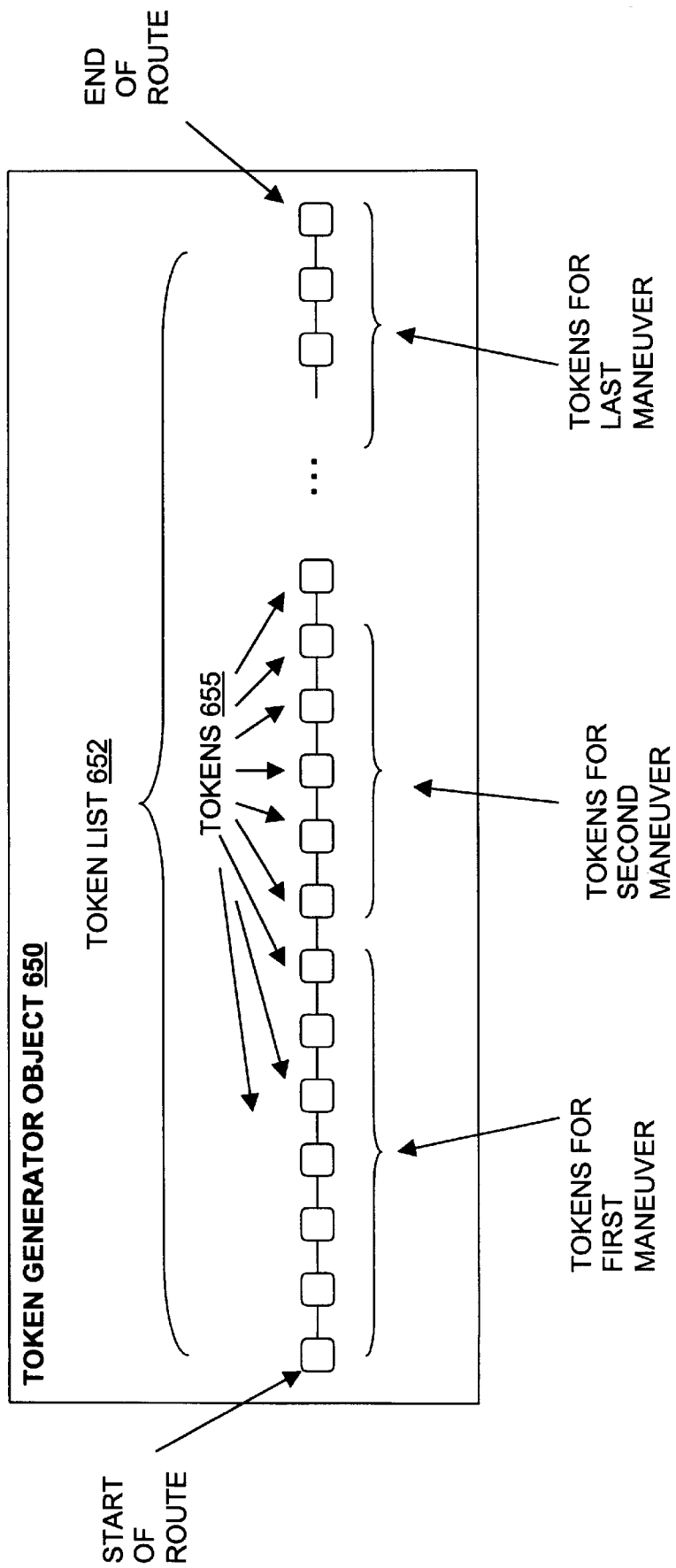
FIG. 6 is a diagram illustrating the components of the token generation object of FIG. 2.

FIG. 6 is a diagram illustrating the components of the token generator object 650. The token generator object 650 contains a token list 652. The token list 652 is comprised of an ordered sequence of tokens 655. A token 655 is used to contain a fragment of the data from which is formed the maneuvering instruction to be explicated to the end-user. Tokens can be independent of the physical form (i.e., visual or audio) in which the maneuvering instructions are provided. Thus, tokens can be converted to either character data or graphics data (for visual display) or audio data (for audio playback). Thus, the tokens represent abstractions of the data units used for explication.

Tokens can contain two types of data: symbols and character string data. Symbols are used to represent words and phrases (or graphics) that are commonly used when providing maneuvering instructions or when building meaningful grammatical constructions as part of maneuvering instructions. For example, symbols may be used for such words and phrases as "INTERSECTION", "MERGE", "TURN LEFT", and so on. In one embodiment, numbers are used for symbols, so that the number 00001 may be used to represent the word "INTERSECTION", the number 00002 may be used to represent the word "MERGE", the number 00003 may be used to represent the phrase "TURN LEFT", and so on. (Examples of symbols and the words or phrases to which they correspond are included at Table 5 in the Appendix. In Table 5, the second column includes the symbols and the first column includes the character text strings corresponding to the symbols.)

Symbols can map to audio data, character text string data, graphics data, or combinations of audio, character text string, and graphics data. The explication tools 700, described below, use this mapping capability to output data to the navigation application 210. If the maneuvering instructions are going to be provided audibly, the audio data (files or portions thereof) mapped to by these symbols are returned by the explication tool 700 to the navigation application 210 and are played back by software in the navigation application 210 and hardware in the user interface 131 in order to hear the maneuvering instructions. If the maneuvering instructions are going to be displayed on a video screen, the character text string data (or the graphics data) mapped to by these symbols are returned by the explication tool 700 to the navigation application 210 and are displayed on a video screen of the user interface 131 in order to see the maneuvering instructions. Alternatively, the explication tool 700 can return combinations of audio data, character string text data, and graphics data so that the maneuver instructions can be provided both audibly and visually. (In Table 5 in the Appendix, the third column includes a textual description of what is heard when the audio data corresponding to the symbol in the second column is played back.)

As stated above, tokens can also contain character string data instead of symbols. Character string data may be included in tokens in order to provide more elaborate and/or meaningful maneuvering instructions. For example, character string data may be used to add the names of geographic features (e.g., road names or point of interest names) to the maneuvering instructions in order to make the instructions more meaningful. For this kind of information, audio data (files or portions thereof) in which the geographic name is rendered in speech may be unavailable. Therefore, a token for this kind of data contains a character string of the geographic feature name. This character string data may be obtained from the geographic database 140 that includes the names of geographic features. For example, the maneuvering instruction "TURN LEFT AT THE NEXT INTERSECTION" could be formed from tokens using only symbols. A more detailed maneuvering instruction could be provided using the name of the geographic feature involved in the maneuver: "TURN LEFT AT THE NEXT INTERSECTION INTO IRVING PARK ROAD." In the latter maneuvering instruction, the words "IRVING PARK ROAD" would be derived from a token that included the character string "IRVING PARK ROAD."

Tokens that contain character string data may be used to provide both audio and visual maneuvering instructions. In order to provide maneuvering instructions audibly from tokens that include character strings, text-to-speech software may be used.

(2) The Rules Tables

Figure 7:
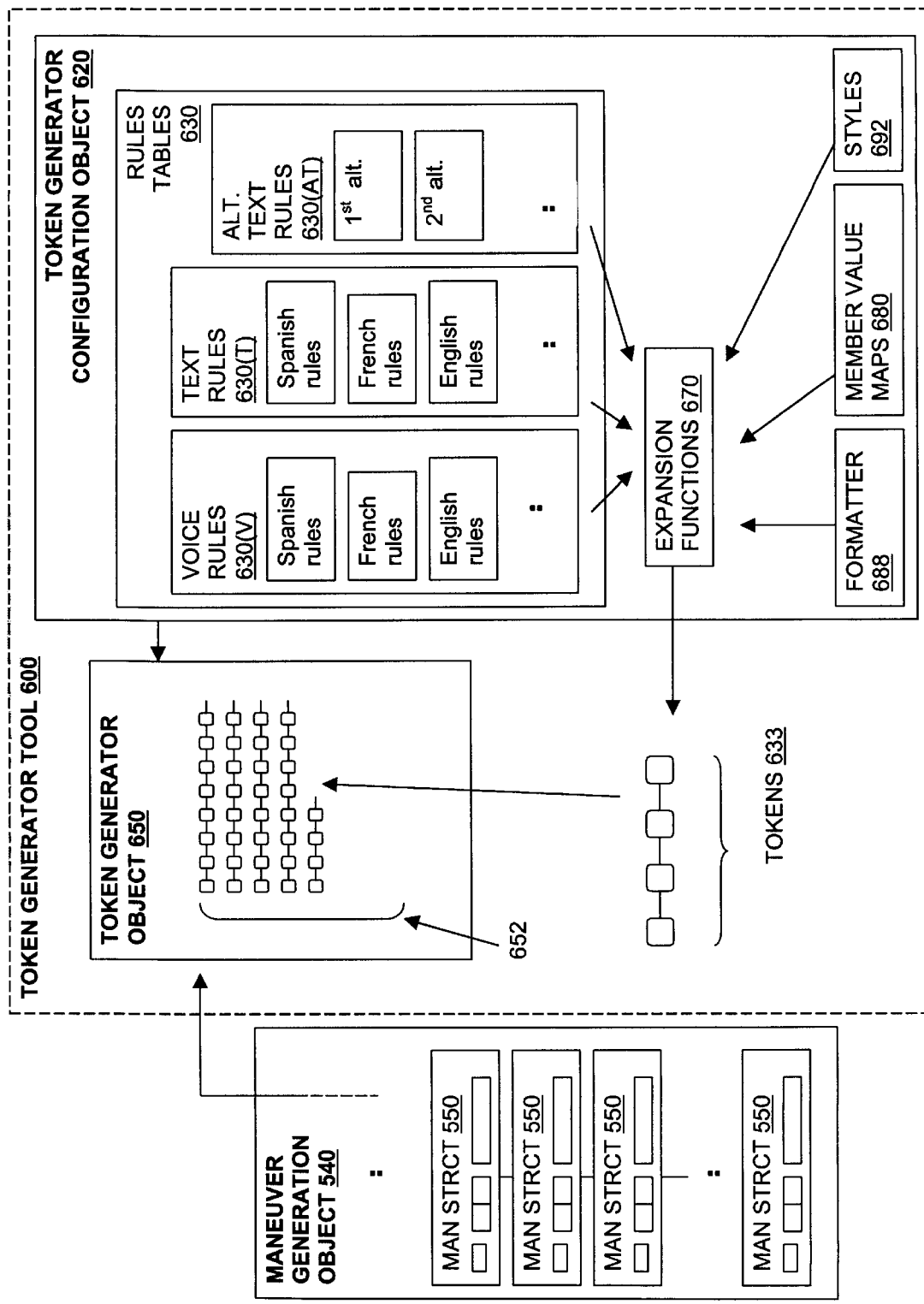
FIG. 7 is a diagram illustrating components of the token generation configuration object of FIG. 2.

The token generator configuration object 620 contains the components used for generating the token generator object 650. These components include configuration parameters and tables necessary for generating a list of tokens. Referring to FIG. 7, the token generator configuration object 620 includes one or more rules tables 630. Each of these rules tables 630 may include rules that are tailored for a specific kind of explication. For example, one kind of rules table is a voice rules table 630(V). The voice rules table 630(V) is used to provide an output in the form of a token generator object 650 in which the tokens are arranged for providing meaningful audio maneuvering instructions. Another kind of rules table is a text rules table 630(T). The text rules table 630(T) is used to provide an output in the form of a token generator object 650 in which the tokens are arranged for providing meaningful maneuvering instructions as text on a video display. (Referring to the Appendix, Table 3 is an example of a rules table for generating tokens for visual display and Table 4 is an example of a rules table for generating tokens for audio playback.)

Although separate rules tables may be used to produce separate token generator objects for voice and text, in an alternative embodiment, both voice and text explication can be provided from the same token generator object produced by a generic rules table.

Rules tables may be provided for explication in different languages. Rules tables are provided for different languages in order to account for the grammatical differences of different languages. The rules table for a language arranges the tokens in the token generator object 650 (from which the words and phrases in the maneuvering instructions are derived) in the proper sequence for correct grammatical constructions in the language in which the maneuvering instruction is being provided. For example, separate rules tables may be provided for English, French, Spanish, German, and so on.

Alternate rules tables may also be provided. These alternate rules table may be used for producing special kinds of token generator objects. For example, if the navigation system has limited video display capabilities, an alternative rules table can be used that produces a token generator object in which the maneuvering instructions derived therefrom are appropriately limited.

Figure 8:
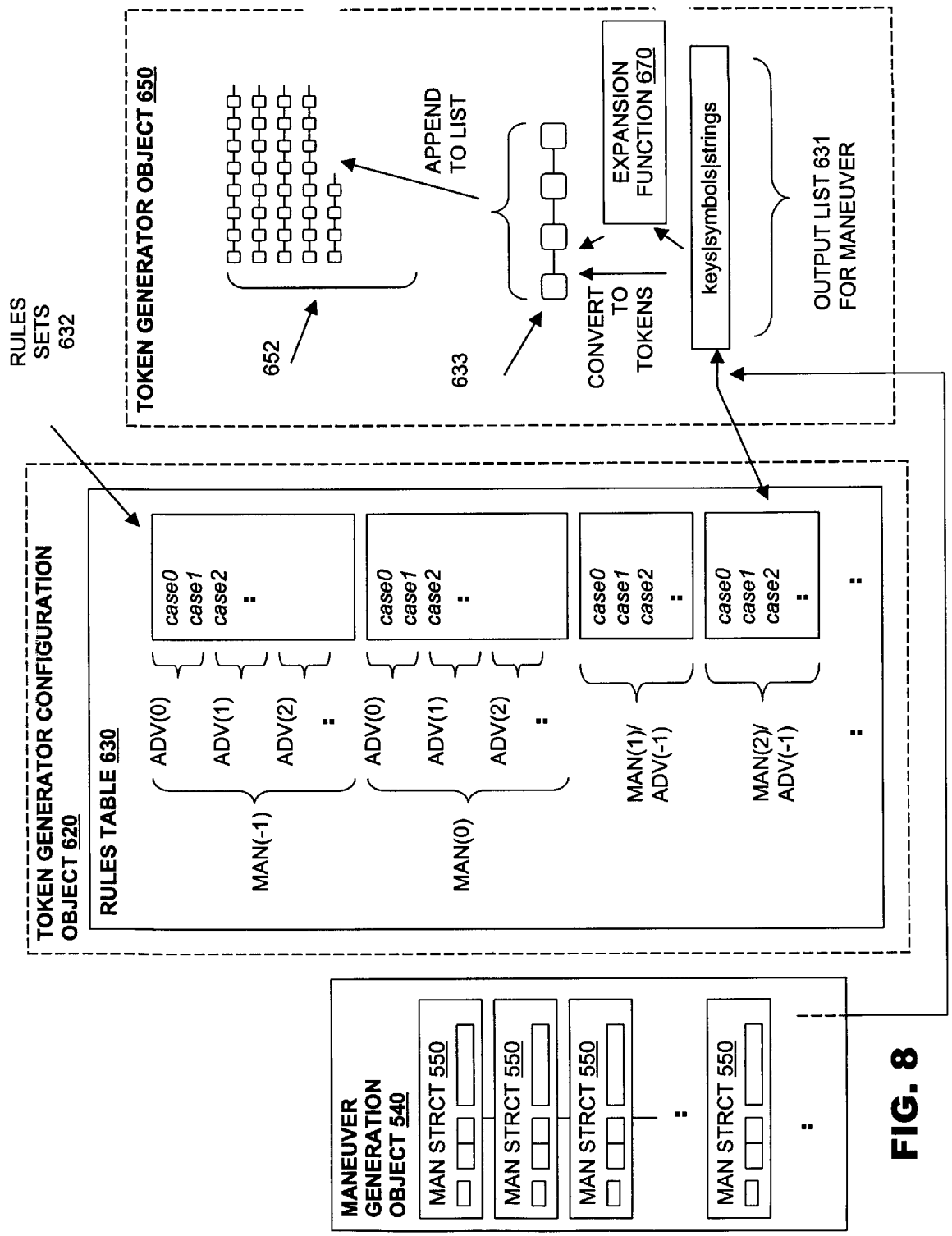
FIG. 8 is a diagram illustrating the components of one of the rules tables of FIG. 7.
Figure 9:
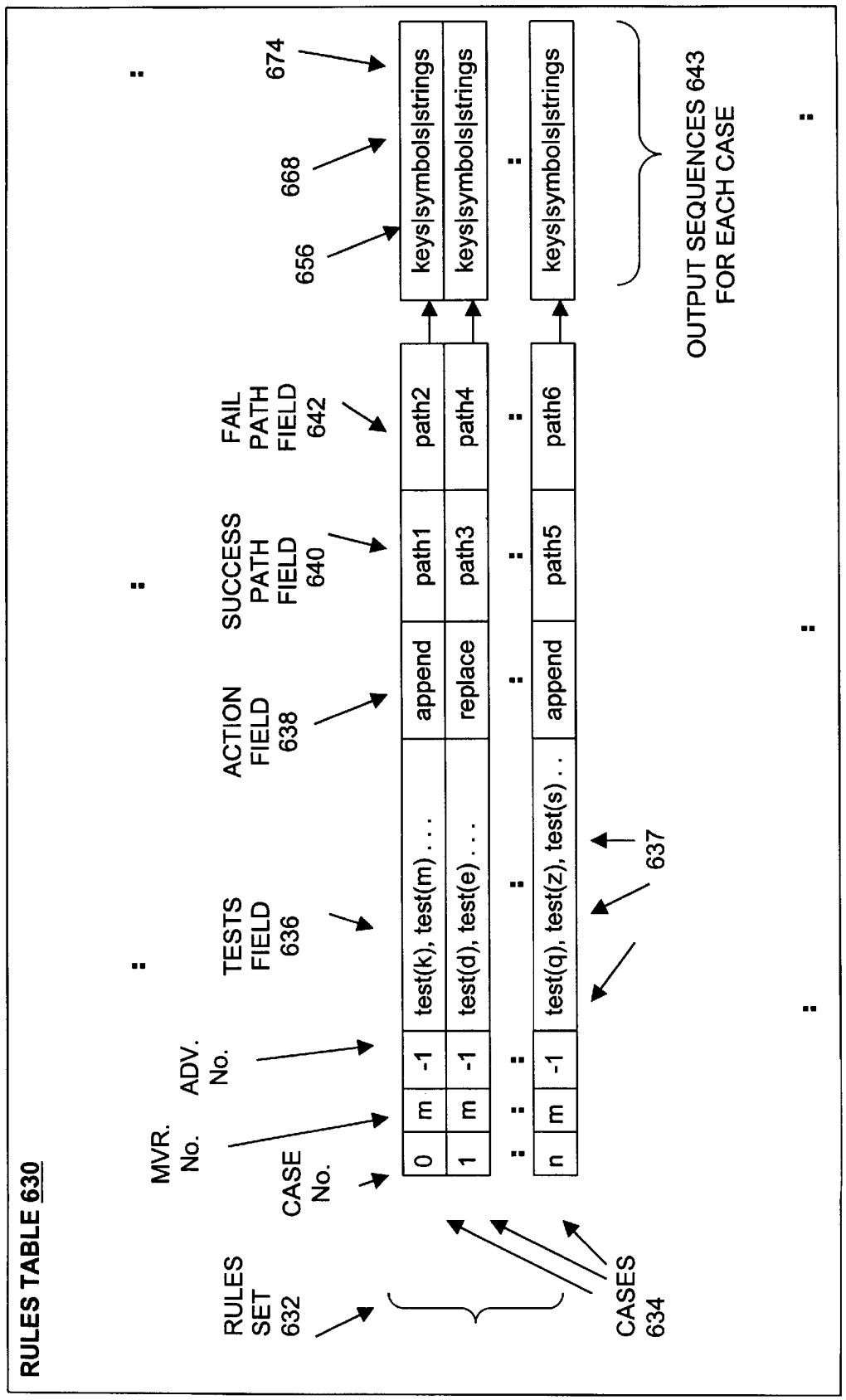
FIG. 9 is a diagram illustrating components of one of the rules sets shown in FIG. 8.

Referring to FIGS. 8 and 9 (and Tables 3 and 4 in the Appendix), each of the rules tables 630 includes structured lists of cases, including tests, associated actions and outputs, that are applied to each of the ordered plurality of maneuver data structures 550 in the maneuver object 540. For each maneuver data structure 550, the token generator object 650 uses the rules in one of the rules tables 630 to form an output list 631. The contents of the output list 631 are converted in the token generator object 650 to an ordered token sequence 633. The token sequences 633 generated from all the maneuver data structures 550 are used to build the token list 652 that is contained in the token generator object 650. As each maneuver data structure 550 from the maneuver generation object 540 is processed, the token sequence 633 formed for that maneuver is added to the token generator object 650. More specifically, the token sequence 633 formed for each maneuver data structure 550 is appended to the end of the partially formed list in the token generator object 650 that contains the tokens, if any, which had already been added from previously processed maneuvers. Once all the maneuvers data structures are processed, the token sequences 633 formed from all the maneuvers 550 form the complete token list 652 in the token generator object 650.

From the token list 652 in the token generator object 650, the route calculated by the route calculation tool 300 can be explicated. Explication is performed by converting the tokens in the token generator object 650 into the appropriate format requested by the navigation application 210. For tokens that are symbols, explication involves obtaining the audio data (files or portions thereof), the text character strings, or the graphics data (files or portions thereof) to which the symbols are mapped. For tokens that are character strings, explication involves returning the character strings for textual maneuvering instructions or performing a text-to-speech conversion for audio maneuvering instructions.

In the token generator configuration object 620, each of the rules tables 630 includes a plurality of rules sets 632. The rules table 630 includes rules sets 632 for different combinations of maneuver types and advisory types that can be found in any of the maneuver data structures 550. As mentioned above, each maneuver data structure 550 includes members, 550(4)(2) and 550(4)(3), that identify a maneuver type and possibly one or more advisory types. The rules table 630 includes a rules set 632 for each maneuver type and each combination of maneuver type and advisory type. For example, in the rules table 630 shown in the FIG. 8, one rules set 632MAN(0) is defined for maneuver type "0", another rules set 632MAN(1) is defined for maneuver type "1", another rules set 632MAN(2) is defined for maneuver type "2" and so on.

Referring to FIG. 9, each rule set 632 in the rules table 630 includes one or more cases 634. Within each rules set, each case is uniquely numbered, e.g., 1, 2, 3 . . . and so on. The cases 634 in each rules set 632 account for each situation that can occur in the maneuver data structure 550 that has that specific combination of maneuver type or advisory type. The cases 634 in each rules set 632 are ordered so that when the configuration object 620 applies the rules set 632 to a maneuver data structure 550 having a specified combination of maneuver type or advisory type, the first case 634 listed in the rules set 632 is applied first.

Each maneuver data structure 550 is treated separately. Also, each maneuver data structure 550 is taken in the order in which it is contained in the maneuver generation object 540. Only the rules sets 632 that include cases that match the specific maneuver type and advisory type in the maneuver data structure 550 are used.

In the embodiment shown in FIG. 9, a rules set is defined for a maneuver type equal to "−1". If a rules set has a "−1" in its maneuver type field, it is satisfied by any maneuver type. For example, a case that has a "−1" in the maneuver type field and an "8" in the advisory type field is applied to any maneuver data structure that has an advisory type of "8." The maneuver data structure may have any maneuver type in its maneuver type field.

Within a rules set, a case that has a "−1" in the advisory type field is satisfied by any advisory type. Thus, if a case has a "4" in the maneuver type field and a "−1" in the advisory type field, it is applied to any maneuver data structure that has a maneuver type of "4." The maneuver data structure may have any advisory type. In this manner, cases for advisory types can be used for more than one maneuver type and cases for maneuver types can be used for more than one advisory type.

Referring to FIG. 9, associated with each case 634 in each rules set 632 is a tests field 636. The tests field 636 for each case 634 identifies one or more tests 637, or the test field 636 may indicate that there are no tests associated with the case. (For example, the tests field 636 may indicate that no tests are required by the presence of a code, such as "−1" in the tests field.) In one embodiment, the tests field 636 identifies each test 637 by a test ID. Each test 637 is formed so that the result of the test is either "pass" or "fail." (In the sample token rules tables included at Tables 3 and 4 in the Appendix, the names of the tests instead of the test ID's are included in the tests fields for the sake of illustration.)

Each test 637 for each case 634 is performed using the data in the associated maneuver data structure 550. For example, one of the tests 637 might check for the presence of a name in the name of exit segment field of the maneuver data structure. Another test might check for the presence of a name in the destination field of the maneuver data structure. The token generator tool 600 includes a number of default tests in the token generator object 650. Additional tests may be defined and included by the navigation application program 210. (The tests 637 are in the code base which makes up the token generator object 650, or if tests are defined in the navigation application 210, the tests 637 may be located there. The test ID's which make up the rules are in the token generator configuration object 620.)

Also associated with each case 634 are an action field 638, a success path field 640, a fail path field 642, and a case output 643. The contents of the case output 643 can include a list of one or more keys 656, symbols 668, or strings 674, or combinations thereof, or alternatively the case output 643 can be empty. Keys, symbols and strings are explained further below. The keys, symbols, and strings in the output list 631 are arranged in the case output in a manner that provides for a meaningful explication of all or part of the maneuver to be provided taking into account the kinds of information included in the maneuver data structure as determined by the tests that are performed for that case.

The action field 638 of a case 634 is defined to have one of two values, "replace" or "append." If all the tests 637 specified in the test field 636 of a case 634 are passed, the action listed in the action field 638 of the case is performed.

If the action field 638 for a case 634 indicates "append", all the contents 645 in the case output 643 of the case are added. This means that any keys 656, symbols 668, or strings 674 listed in the case output 643 of the successfully passed case are added to any keys 656, symbols 668, or strings 674 already appended for that same maneuver by a previously performed case, if any. This collection of newly appended and already appended keys 656, symbols 668, or strings 674 is temporarily saved as a potential output list 631 for the maneuver while any more cases (which may include additional tests) for the same maneuver are performed. If there are no keys 656, symbols 668, or strings 674 from a previous case for the same maneuver, the contents 645 of the case output 643 of the successful case are temporarily saved as a potential output list 631 for the maneuver while any tests associated with any further cases associated with the same maneuver are performed (In the example token rules tables included at Table 3 and Table 4 in the Appendix, the case outputs do not show the actual numeric values of the symbols. Instead, the case outputs in the example Tables 3 and 4 show the equivalent textual character strings represented by the symbols. This is done for illustration purposes.) If all the tests 637 specified in the test field 636 associated with a case 634 are passed and the action field 638 indicates "replace", any keys 656, symbols 668, or strings 674 already appended for that same maneuver by a previously performed case, if any, are replaced with the contents 645 of the successfully passed new case. The keys 656, symbols 668, or strings 674 of this successfully passed new case are temporarily saved as a potential output list 631 for the maneuver while any tests associated with any further cases associated with the same maneuver are performed.

As mentioned above, the tests field 636 of a case 634 may indicate that there are no tests associated with the case. This may be indicated by a "−1" in the tests field 636. If there are no tests indicated in the tests field 636, the tests field is treated as satisfied for the case and the action specified in the action field 638 is performed. Thus, the action specified in the action field 638 of a case 634 with no specified tests is always performed when that case is encountered for the maneuver.

For successful cases (i.e., cases in which all the tests 637 identified in the tests field 636 are passed), after the action specified in the action field 638 is taken, the next step performed is the step specified in the success path field 640 of the case. The success path field 640 may identify the next case to be performed (e.g., by case number) for that maneuver, or the success path field 640 may indicate that there are no more cases required to be performed for that maneuver. If the success path field 640 indicates another case is to be performed, the tests 637 specified in the tests field 636 of that new case are performed. This process continues in this manner until no more cases are indicated to be performed for that maneuver.

For a case in which any of the tests 637 specified in the tests field 636 are not passed, the case is treated as failed. The action specified in the action field 638 of a failed case is not performed. Any data items from any previously performed case for that same maneuver which are being temporarily saved as a potential case output 643 are left alone.

For a failed case, the next step performed is the action specified in the fail path field 642. Like the success path field 640, the fail path field 642 identifies the next case to be performed for that maneuver, or the fail path field 642 may indicate that there are no more cases required to be performed for that maneuver.

(3) Generating Tokens

At this stage, after all the applicable cases in the rules sets for a maneuver are performed, the contents of the output list 631 built for the maneuver include the combined contents of the case outputs 643 of all the successful cases (except for any which were replaced by subsequently performed cases requiring replacement instead of appending). As mentioned above, case outputs 643 may contain keys, symbols, strings, or combinations thereof. These keys, symbols, and strings in the output list 631 are converted to tokens by the token generator object 650. The order in which the symbols, keys, and strings are included in the output list generated for each maneuver is maintained in the ordered token sequence formed therefrom.

Figure 10:
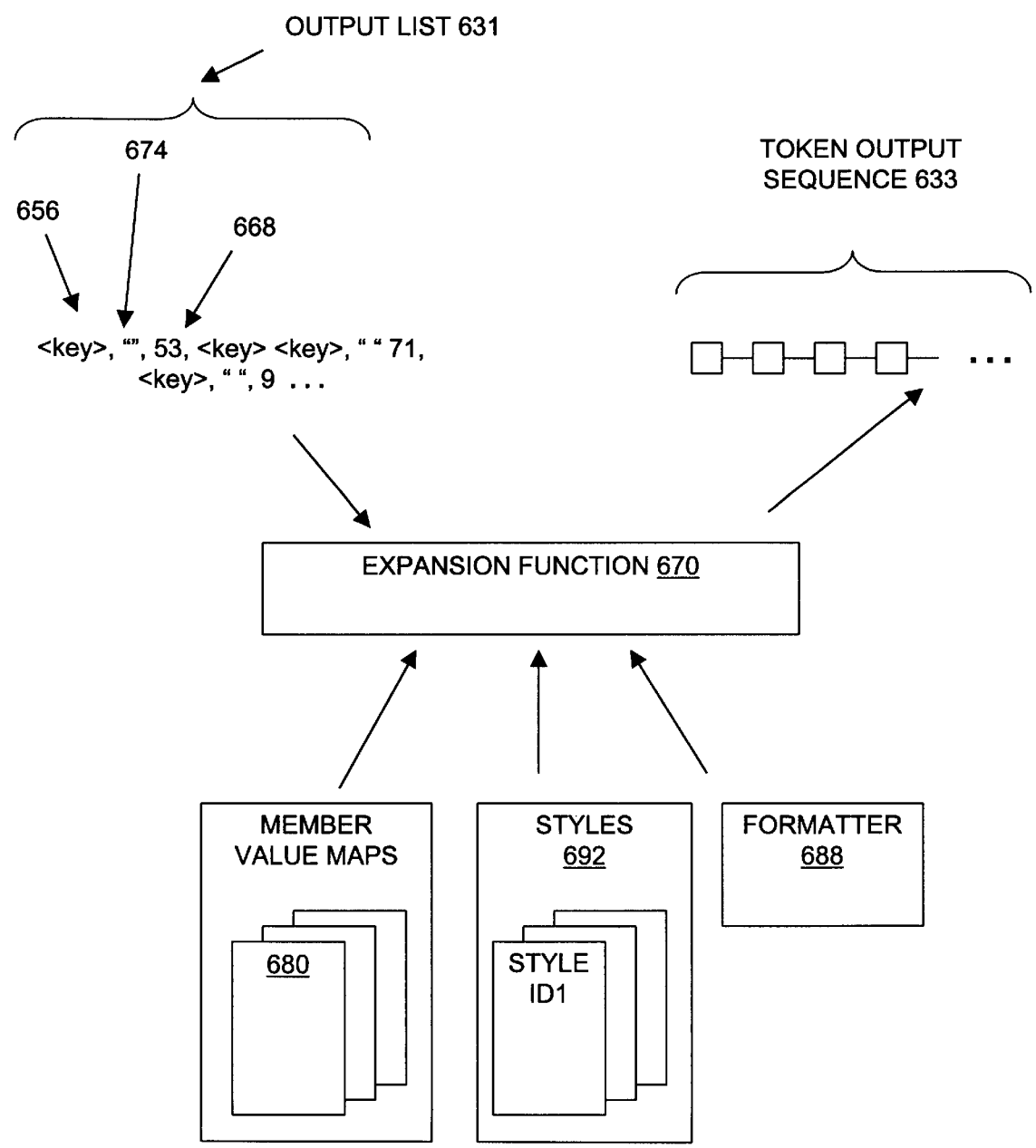
FIG. 10 is a diagram illustrating expansion of keys into tokens by the expansion function shown in FIG. 7.

FIGS. 8 and 10 show the contents of the maneuver output list 631 made up of keys, symbols, and strings. Each of these may be distinguished by appropriate characters. In the embodiment of FIG. 10, keys are encompassed by angle brackets (< >) and strings are encompassed by parentheses (" "). An entry in an output list 631 that is encompassed by neither angle brackets nor parentheses is taken to be a symbol. Each key, symbol and string in the output list 631 forms a token which is added to the token generator object.

a. Symbols.

Symbols 688 are used to represent those portions of the maneuvering instructions that give meaning to the end-user. For example, in the maneuvering instruction that displays the text "TURN RIGHT ON MICHIGAN AVENUE", one or more symbols would have been included in the output list of the maneuver to represent the phrase "TURN RIGHT ON". A key would be used in the output list of the maneuver to represent the phrase "MICHIGAN AVENUE."

In this example, the symbol in the output list 631 of the maneuver would have been included in a case output 631 added by of one of the successful cases performed for the maneuver. The case that added the case output that included this symbol might have included a test in its test field that checked whether the name of the road in the road name field for the segment data entity identified in the exit segment field was different than the name of the road in the road name field for the segment data entity identified in the exit segment field.

In forming the ordered token sequence 633 from a maneuver output list 631, when symbols are encountered, they are formed into tokens. Each symbol in the maneuver output list is formed into one token in the ordered token sequence formed therefrom.

(In a development environment, it may be easier to refer to symbols by the words or phrases that the symbols represent. Accordingly, the token generator tool allows developers to use the words and phrases that the symbols will represent instead of the actual numeric symbols.)

b. Keys.

Keys are used to refer to data contained in the maneuver data structure. Thus, keys are relatively dynamic. Each maneuver data structure in the maneuver generation object may include different data and therefore, the maneuver data structure members to which the keys refer may change from one maneuver data structure to the next. For example, if it is desired to provide a maneuvering instruction to the end-user that displays the text "TURN RIGHT ON MICHIGAN AVENUE", a key would be used in the case output list to refer to the name of the exit segment (i.e., "MICHIGAN AVENUE"). In this example the key might take the form:

<NAME_EXIT_SEGMENT>.

In forming the ordered token sequence 633 from this maneuver output list 631, when a key is encountered, the corresponding item of data included in the maneuver data structure is identified. This item of data is used to form the key. This key is then expanded into a token which is then added to the ordered token sequence 633 for that maneuver.

In this example, the key in the output list 631 of the maneuver would have been included in a case output 631 added by one of the successful cases performed for this maneuver. The case that added the case output that included this key might have included a test in its test field that checked whether the maneuver data structure 550 included data in the road name field (550(2)(2) in FIG. 5) for the segment data entity identified in the exit segment field (550(1)(2) in FIG. 5).

Expansion Function. Each key has an associated expansion function 670 that is used to expand the key into a token, which is then included in the ordered token sequence 633 for that maneuver. An expansion function is associated with a key when it is defined. The expansion function 670 accounts for any kinds of formatting or style considerations that relate to forming a user-friendly instruction from the data from which the key was derived. (Like the tests 637, the code for the expansion functions is located in the code base of the token generator object 650. When expanding keys, the expansion functions use data, such as styles and member maps described below, which are located in the token generator configuration object 620.)

Styles. When certain kinds of keys are expanded, there are different ways that the data represented by the key can be expressed. For example, a maneuvering instruction might indicate a distance to the next maneuver. A key would be used for this purpose. The key might be included in the case output of a case that checks for the presence of data in the maneuver data structure field for the distance to the next maneuver (i.e., 550(4)(4) in FIG. 5). If there is data in this field, the case output would be added to the maneuver output list 631. The item of data referred to by the key would be a number (e.g., 1500) that indicates the distance to the next maneuver in meters. However, there are different ways that this information can be expressed. For example, a distance of "1500 meters", can be expressed in English in the following different ways: "1.5 km", "1 and a halfkm", "1500 m", "fifteen hundred meters", "1 km 500 m", and so on. Some of these ways may be preferable if the maneuver is being explicated audibly whereas other ways may be preferable if the maneuver is being explicated on a video display. In either case, it is preferable to make the explication of the maneuver consistent. There are similar considerations related to expressing the data referred to by the key in different languages.

When expanding a key, the token generator tool provides for selecting how certain kinds of keys are expressed. Moreover, the token generator tool provides for making exceptions, as appropriate, in order to accommodate language idiosyncrasies. The token generator tool provides that a key can have a style code 692 associated with it. A style code is used in the key to define the way in which the value represented by the key is expressed. This style code is used by the expansion function when expanding the key.

The token generator configuration object 620 includes one or more styles for expressing different kinds of information included in keys, such as distance, time, numbers, and so on. These styles are identified by style ID's, such as "1", "2", and so on. A style code can be attached to a key and is used to determine the way in which the value represented by the key is expressed. Use of a style is illustrated in the following example:

EXAMPLE 1

A key is defined in a case output as <DISTANCE_FROM_ORIGIN:1> In the key, the value "1" following the colon is the style code.

In the token configuration object, a style having an ID of 1 is defined as providing that the key be expressed as x meters where x is the value in the key DISTANCE_FROM_ORIGIN. If the value of the corresponding DISTANCE_FROM_ORIGIN member of the maneuver data structure is "7", then the expansion function 670 forms a token from this key by adding the character string "meters" to a character string formed from the value of the DISTANCE_FROM_ORIGIN. The resultant character string "7 meters"

forms the contents of a token which is added to the ordered token sequence for that maneuver.

EXAMPLE 2

The style code attached to the key is "2". This style is defined in the token configuration object as x*(1.61) miles If the value of the DISTANCE_FROM_ORIGIN in the maneuver data structure is "7", then the expansion function 670 forms a token from this key containing the character string as follows:

"11.27 miles"

FORMATTERS

Another factor to be considered when explicating certain kinds of keys relates to the number of decimal places to be included in a number or the number of characters to be included in a name. For example, when a key is used to express a distance to the next maneuver, the navigation system and the geographic database may have computer processing capability and accuracy to determine the distance to the next maneuver to 7 decimal places. However, for an end-user engaged in driving an automobile, this level of precision would likely be unnecessary.

The expansion function 670 in the token generator tool 700 also provides for selecting the number of places to which certain kinds of keys are expressed. Moreover, the token generator tool provides for making exceptions, as appropriate, in order to accommodate idiosyncrasies. The token generator tool provides that a key can have a formatter associated with it. A formatter code 688 is used to define the number of decimal places to be used in expressing certain tokens that are represented by certain keys. Use of a formatter code is illustrated in the following example:

<DISTANCE_TO_NEXT_MANEUVER%2>

The value after the % sign is the formatter code. This formatter code is used to format the key. The key expansion function uses this information in the formatter code when building the tokens. In this example, the distance to the next maneuver is limited to only two decimal places.

The formatter code can also be used to truncate character names to a specified number of characters. The formatter code can be used in this manner to facilitate the display of certain long geographic names. When used with keys that represent names of streets, towns or points of interest, the formatter function truncates the value in the keys to the number of characters specified in the formatter code.

MEMBER VALUE MAPS

Still another factor relates to the expansion of other kinds of keys. Some kinds of keys are used to represent data that undergoes a translation or mapping when they are expanded from a value in the maneuver data structure to another value in the token. An example of a key of this kind includes the heading. It may be desired to provide a maneuvering instruction such as "HEAD NORTHWEST ON ROUTE 95" on a display screen. The word "NORTHWEST" in the maneuvering instruction is derived from a token, which included a symbol, which in turn was formed from a key for the heading for the maneuver in the maneuver data structure. A key for the heading (e.g., <CONTEXT_HEADING>) refers to the heading member in the maneuver data structure, (550(3)(5) in FIG. 5). In the maneuver data structure, the heading may be expressed as a number. This number may be in the range of 0–255, for example, with 0 referring to due north and each of the other numbers (1–255) referring to a relative number of degrees in a clockwise direction therefrom. The expansion function provides for translating the form in which the heading is expressed in the key (e.g., 223) into a form which is included in a token, which then can be explicated as the word (e.g., "NORTHWEST") in a maneuvering instruction.

To provide for this functionality, the expansion function 670 uses a member value map 680. In a preferred embodiment, the member value map 680 does not associate the values that the keys can assume directly into character strings. Instead, the member value map 680 associates values of keys to symbols. These symbols are then formed into tokens. These symbols are used the same way as the symbols used to represent commonly used maneuvering instructions. Specifically, these symbols map to either characters strings for textual explication or audio data for audio explication.

To provide for this feature, at least some members of the maneuver structure 550 have a maneuver data structure member ID. A set of value-to-token maps is associated with each of these maneuver structure member ID's. The member value map 680 provides for associating different symbols with different values in each field of the maneuver structure. Then, when a key is expanded for that member and that member has a member value defined for it in a member value map, a token is generated that includes the associated symbol.

For example, a set of member value maps can be defined for the maneuver data structure member <CONTEXT_HEADING>. The set can include 8 member values for the directions "north", "south", "east", or "west", "northeast", etc. Associated with each of these member values is a numeric symbol, e.g. 1, 2, 3, 4, 5, etc. When the key <CONTEXT_HEADING> is expanded, the expansion function uses the member value map 680 to look up the symbol for the value in the key and generates the appropriate token that includes the symbol.

Using member values maps for certain kinds of keys helps make the token generator tool flexible and language independent. By expanding the key to a symbol, instead of a character string, the language independence and format (audio vs. video) independence is maintained. The symbol included in the token can be mapped to a character string, voice data, or graphics data in any chosen language by the explication tool 700.

c. Strings.

As mentioned above, the maneuver output list 631 may also include strings 674. Like symbols and keys, a string occurs in an output list 631 when a successful (and not replaced) case for that maneuver included the string in its case output. A string 674 is comprised of ordinary character data. Strings can be useful for textual guidance where the contents of the string are displayed visually on a display screen to the end user. When strings are converted to tokens, the string of character data forms the token, which is then included in the token list for that maneuver. Strings can also be used to include control characters used for formatting textual output. For example, a string consisting of a single blank space (e.g., " ") can be placed between a symbol 668 and a key 656 in an output list 631. This string is converted into a token representing a single blank space. Then when the maneuver is visually displayed to the end-user on a display screen, a space will appear between text derived from the token containing the symbol and the text contained in the token expanded from the key.

Strings may be used for other formatting, such as tabs, carriage returns, and so on. Conventional control characters may be used for this purpose.

Strings may also be used for display of other textual data. Strings may also be used for explication of voice data using text-to-speech conversion software.

(4) Combined Maneuvers

There are at least several ways in which maneuvering instructions about a calculated route can be provided to the end-user of a navigation application program. One way is to provide all the maneuvering instructions to the end-user at the same time. Another way is to provide maneuvering instructions to the end-user one at a time. This latter way may be used when the end-user is traveling the calculated route so that the maneuvering instruction is provided to the end-user at some time in advance of when the maneuver is required to be taken. Regardless of the way in which maneuvering instructions are provided the end-user, the maneuvering instructions may be made more meaningful if they are organized into collections or presentations. For example, if a driver is required to make a single left turn at an upcoming intersection and then travel 3 miles, a maneuvering instruction may be presented on a display screen to the driver that states: "TURN LEFT AT THE NEXT INTERSECTION AND TRAVEL 3 MILES." However, if the driver is required to make a left turn at an upcoming intersection, and then make a right turn onto a ramp 100 feet after making the left turn, and then travel 3 miles, a maneuvering instruction may be provided that states: "TURN LEFT AT THE NEXT INTERSECTION AND THEN IMMEDIATELY TURN RIGHT ONTO THE RAMP, THEN TRAVEL 3 MILES." In the latter example, even though the maneuver generation tool would have produced separate maneuver data structures for the left turn at the intersection and the right turn onto the ramp, from the standpoint of the end-user, it may be more meaningful to be advised of both maneuvers at the same time. Therefore, when providing maneuvering instructions to an end-user it may be desirable to group more than one maneuver together when presenting them to the end-user. This consideration applies whether the maneuvers are being presented audibly or visually.

Certain kinds of rules can be used in the rules table in order to accommodate the presentation and grouping of maneuvers. For example, a case in a rules set can check the distance-to-next-maneuver field of the maneuver data structure, and if it is not empty, include a case output that includes symbol(s) for the words or phrase "THE DISTANCE TO THE NEXT MANEUVER IS", followed by a key that takes the value in the distance-to-next-maneuver field. Because this case may be used for many, if not most, maneuver types, it can be set up as a case that is performed after every maneuver. In this manner, this case does not have to be repeated in each rules set for each maneuver type. This case can be set up to be performed after each maneuver by assigning it a maneuver type (e.g., −3), and providing that a case with maneuver type of −3 be performed after each maneuver.

Various kinds of rules can be set up in this manner. For example, for formatting purposes, it may be desired to insert line breaks or page breaks after a displayed maneuver. Rules that include cases can be set up for this purpose and these cases will be performed after each displayed maneuver. Another rule can be set up to be performed before each maneuver, for example to identify the maneuver by number or type.

When the driving maneuvers are relatively close together, as in the above example, it may be desired to group them together so that they are presented to the end-user as a combined maneuver instruction. A rule can be set up to check for multiple maneuvers. This rule would include a case that checks the multiple maneuver flag 550(4)(1) of the maneuver data structure (in FIG. 5) to determine whether it is part of a multiple maneuver. If it is, the formatting that separates one maneuver from the next are used only after the last of the series of multiple maneuvers. In this manner, maneuvers included in distinct maneuver data structures can be presented to the end-user at one time as combined maneuvers.

E. ROUTE GUIDANCE TOOL/EXPLICATION TOOLS

After the token generator tool 600 builds the list of tokens in the token generator object 650, the explication tool 700 uses the token generator object 650 to return data to the navigation application 210 to explicate the calculated route to the end-user. The kind of data returned by the explication tool 700 to the navigation application 210 may be configured to correspond to the hardware resources of the navigation system. Thus, if the navigation system supports only text instructions, then the kind of data returned by the explication tool 700 will include textual data, but not audio or graphic data.

If the navigation system supports more than one type of route guidance explication format, the navigation application 210 may request that data returned by the explication tool 700 correspond to a particular one or more of these kinds. This request by the navigation application 210 may be made at the time of a request for route calculation and guidance from the end-user. Alternatively, the explication tool 700 may be configurable with defaults by the navigation application 210 so that the same one or more kinds of explication (text, voice, or both) are returned.

Figure 11:
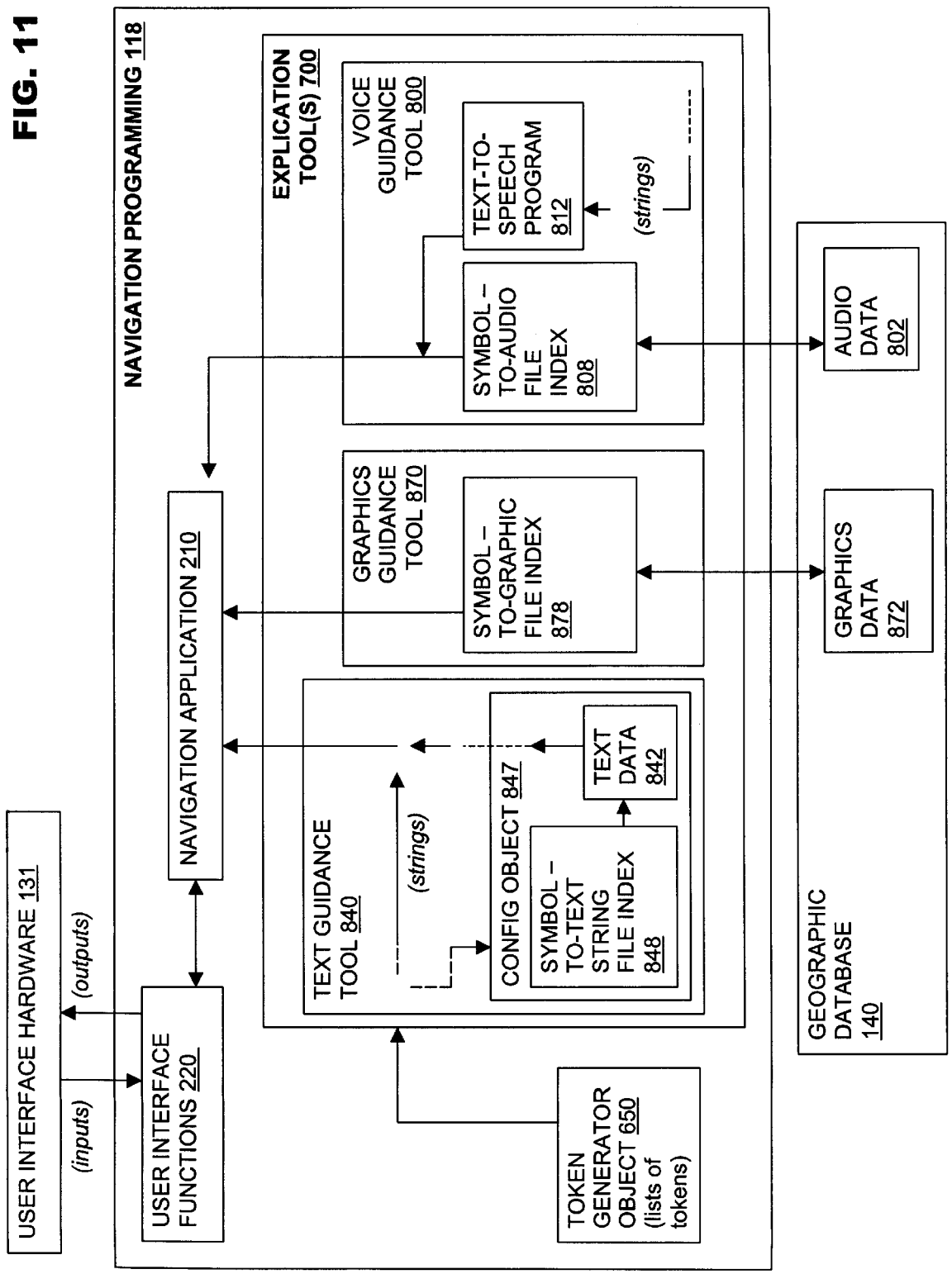
FIG. 11 is a diagram illustrating explication of the tokens in the token generation object by the explication tool shown in FIG. 2.

As shown in FIGS. 2 and 11, the explication tool 700 may be comprised of one or more tools. In one embodiment, the explication tool 700 includes three tools: a voice guidance tool 800, a text guidance tool 840, and a graphics guidance tool 870. In alternative embodiments, the explication tool 700 may include additional tools or alternatively, the explication tool 700 may include fewer than these three tools, such as only one or two of these tools. The operation of these three explication tools is described below.

As shown in FIG. 11, referring first to the voice guidance tool 800, the voice guidance tool 800 receives the token list included in the token generator object 650 from the token generator tool 600. The voice guidance tool 800 is used in an embodiment that includes symbol audio data files 802. These symbol audio data files 802 may be included in the geographic database 140 or alternatively, the symbol audio data files 802 may be included in another database or on another medium which is accessible to the voice guidance tool 800. Each of these symbol audio data files 802 contains data that can be converted to sound. More specifically, each of these symbol audio data files 802 includes data that expresses a spoken word or phrase when played back using appropriate hardware and software in the navigation system. For example, symbol audio data files 802 may be provided for the spoken words and phrases for "TURN", "LEFT", "STAY TO THE", "INTERSECTION", and so on.

When the voice guidance tool 800 processes the tokens, each token is taken in the order in which it is included in the token generation object 650. As mentioned above, tokens can be either symbols or strings. Each of the tokens that is a symbol maps to one or more of the symbol audio data files 802. Using an index 808, the voice guidance tool 800 looks up the appropriate symbol audio data file associated with the symbol. This index 808 may be included in the geographic database 140 or alternatively, the index 808 may be included in another database or on another medium that is accessible to the voice guidance tool 800. The voice guidance tool 800 accesses the appropriate symbol audio file and returns it to the navigation application. The voice rules 630 (in FIG. 7) that form the tokens in the token generator object 650 arrange them in the proper sequence for voice explication. Therefore, when the voice generator tool 800 returns the audio data files 802 represented by the tokens to the navigation application 210, the voice generator tool 800 maintains them in the order that corresponds in the tokens from which they were derived.

As stated above, tokens may also be strings. The voice guidance tool 800 can also process tokens that are strings. Strings may be used as tokens to express the names of streets, municipalities, points of interest, and so on. The strings that form tokens may be derived from the geographic database 140 which includes character string data for the names of streets, municipalities, points of interest, and so on. These strings may be derived from keys that reference members of the maneuver data structure. Strings that form tokens may also be defined in the case outputs in the rules tables in the token generator configuration object 620. Tokens that are strings do not have symbol audio data files 802 associated with them. Therefore, a text-to-speech software program 812 may be used to generate an audio data file to express the string of data in the token. The text-to-speech software program 812 may be included as part of the voice guidance tool 800 or alternatively, the text-to-speech software program 812 may be included as part of the navigation application. When the voice guidance tool 800 encounters a token that is string of data, the text-to-speech software program 812 generates an audio data file from the string of character data contained in the token. The text-to-speech software program 812 may use techniques that are known in the art to perform this function. The voice guidance tool 800 arranges the audio data files generated by the text-to-speech software program 812 with the audio data files 802 obtained from the geographic database in order to maintain the sequence specified in the token generator object for the tokens.

In an alternative embodiment, the voice guidance tool 800 does not include a text-to-speech software program. In this alternative, the token generator configuration object 620 is configured to use a set of voice rules 630(V) that produces a token generator object 620 in which none of the tokens is a string. Instead, according to this alternative, the voice rules 630(V) generate case outputs that result in all the tokens being symbols for which symbol audio files 802 are available for explication by the voice guidance tool 800.

As mentioned above, the explication tool 700 can also include the text guidance tool 840. The text guidance tool 840 operates similarly to the voice guidance tool 800. The text guidance tool 840 receives the token list included in the token generator object 650. The text guidance tool 840 is used in an embodiment that includes symbol text data 842. The symbol text data 842 may be included in the geographic database 140 or alternatively, the symbol text data files 842 may be included in another database or on another medium which is accessible to the text guidance tool 840. In the embodiment shown in FIG. 11, the symbol text data 842 are included in a text guidance configuration object 847 which is part of the text guidance tool 840. The symbol text data 842 contains character text that can be displayed as text, such as a word or phrase, using appropriate hardware and software. For example, the symbol text data 842 may be provided for the words and phrases for "TURN", "LEFT", "STAY TO THE", "INTERSECTION", and so on.

The text guidance tool 840 processes the tokens in the order in which they are included in the token generation object 650. As mentioned above, tokens can be either symbols or strings. Each of the tokens that is a symbol maps to one or more of symbol text data 842. Using an index 848, the text guidance tool 840 looks up the appropriate symbol text data file(s) 842 associated with the symbol in the token. This index 848 may be included in the geographic database 140 or alternatively, the index 848 may be included in another database or on another medium that is accessible to the text guidance tool 840. In the embodiment shown in FIG. 11, the index 848 are included in the text guidance configuration object 847 which is part of the text guidance tool 840. The text guidance tool 840 accesses the symbol text data 842 and returns them to the navigation application. The token generator tool 600 specifies an appropriate order for the tokens in the token generator object. The text guidance tool 840 maintains the text data from the symbol text data 842 in this same order The text guidance tool 840 also processes tokens that are strings. Strings are used to express names of streets, municipalities, points of interest, and so on. These names are included as data in the geographic database 140 and may be derived from keys that reference members of the maneuver data structure 550. When the text guidance tool 840 encounters a token that is string of data, it is arranged with the rest of the strings derived from the rest of the tokens. The order in which the tokens had been arranged in the token generator object is maintained. The text rules that form the tokens in the token generator object 650 arrange them in the proper sequence for text explication. Therefore, the text generator tool 842 returns the text data represented by tokens in the order in which the tokens are arranged in the token generator object.

The explication tool 700 can also include the graphics guidance tool 870. The graphics guidance tool 870 operates similarly to the voice guidance tool 800 and the text guidance tool 840. The graphics guidance tool 870 receives the token list included in the token generator object 650. The graphics guidance tool 870 is used in an embodiment of the geographic database 140 that includes symbol graphic data files 872. These symbol graphic data files 872 may be included in the geographic database 140 or alternatively, the symbol graphic data files 872 may be included in another database or on another medium which is accessible to the graphics guidance tool 870. Each of these symbol graphic data files 872 contains graphical data that can be displayed on a visual computer display. For example these symbol graphic data files 872 may include a display for an intersection, a merge, a U-turn, a railroad crossing, and so on.

The graphics guidance tool 870 processes the tokens in the order in which they are included in the token generation object 650. As mentioned above, tokens can be either symbols or strings. Each of the tokens that is a symbol maps to one or more of symbol graphic data files 872. Using an index 878, the graphics guidance tool 870 looks up the appropriate symbol graphic data files 872 associated with the symbol in the token. This index 878 may be included in the geographic database 140 or alternatively, the index 878 may be included in another database or on another medium that is accessible to the graphic guidance tool 870. The graphic guidance tool 870 accesses the symbol graphic data files 872 and returns them to the navigation application 210. The token generation tool 600 specifies an appropriate order for the tokens in the token generator object. The graphics guidance tool 870 maintains the data from the symbol graphic data files 872 in this same order As stated above, the explication tool 700 may include more than one of the voice guidance tool 800, the text guidance tool 840 and the graphics guidance tool 870. If the explication tool 700 includes more than one of these tools, the route calculated by the route calculation tool can be explicated to the end-user in more than one format. For example, if the explication tools 700 include both the text guidance tool 840 and the voice guidance tool 800, the route calculated by the route calculation tool can be explicated to the end-user with both audible and visual instructions. The audible instructions can be provided via appropriate hardware in the user interface 131, such as a speaker, and the visual instructions can be provided by a display screen in the user interface 131. Both the visual instructions and the audio instructions can be provided by the explication tool using the same token generator object generated by the token generator tool 600. Alternatively, the visual instructions and the audio instructions can be provided by the explication tool using two separate token generator objects generated by the token generator tool 600. In this latter embodiment, the token generator tool uses one rules set for generating a first token generator object tailored for visual presentation and uses another rules set for generating a second token generator object tailored for audio presentation. The token generator object tailored for visual presentation can include more detail such as street names, etc., since the information needed to present this information is readily available in the geographic database. The token generator object tailored for audio presentation includes less detail and may omit tokens for street names, etc., thereby avoiding the need to provide for text-to-speech conversion software.

VI. ALTERNATIVE EMBODIMENTS

Configurability One of the advantages afforded by the flexible design architecture of the token generator tool is that is can be modified, enhanced, augmented, and extended by a user. In this context, the user is not necessarily the ultimate end-user who might be an individual who actually uses the navigation application program in a navigation system. Instead, the user may be an intermediate customer who incorporates the token generator tool with other software and, in turn, sells a system or program that includes the token generator tool included with such other software to the ultimate end-user.

In the embodiment described above, the navigation application was described as being installed in a navigation system that was installed in a vehicle. In alternative embodiments, the navigation application can be installed in other kinds of platforms, including personal computers, hand held computing devices, telephones, and so on. The navigation application can also be installed on a network and made available to a client on the network. In alternative embodiments, some portions of the navigation application may be located locally and other portions of the navigation application may be located remotely. The network may be a wireless network. The navigation application, or portions thereof, can be made available over the Internet.

Other terminology may be used to refer to the physical features or to the data that represent the physical features. It is understood that the subject matter disclosed herein is not limited to any particular terminology that expresses similar concepts.

It is intended that the foregoing detailed description be regarded as illustrative rather than limiting and that it is understood that the following claims including all equivalents are intended to define the scope of the invention.

APPENDIX
(sample tables)

© 1998 NAVIGATION TECHNOLOGIES CORPORATION

**TABLE 1-
SAMPLE MANEUVER RULES
FOR MANEUVER GENERATOR**

| | | # | 4 | 5 | 14 | 23 | 6 | 24 | 37 | 62 |
|---|---|---|---|---|---|---|---|---|---|---|
| Maneuver Type | | | Turn to stay on street A | Turn to stay on street A (Hard - No MCI - Not a UTurn) | Turn to stay on ramp A | Turn to stay on controlled access A | Turn onto street B | Turn to go onto controlled access B (from a controlled access) | Turn onto ramp B from CA/street/ramp | Turn R/L to go R/L |
| | Test IDs: | | 4 | 5 | 14 | 23 | 6 | 24 | 37 | 62 |
| Turn Angle | Fork | 1 | | | | | | | | |
| | Merge | 2 | | | | | F | | | |
| | Straight | 3 | F | | F | F | | | F | |
| | Hard Turn | 4 | F | F | | | | | | |
| | One or more segments | 5 | | T | T | | | | T | |
| Entry Segment | Street | 6 | T | T | F | F | T | F | | |
| | Ramp | 7 | F | F | T | F | F | | F | |
| | Controlled Access | 8 | F | F | F | T | | F | | |
| | Frontage | 9 | | | | | | | | |
| | Boat Ferry | 10 | F | F | F | F | F | F | F | |
| | Rail Ferry | 11 | F | F | F | F | F | F | F | |
| | Roundabout | 12 | | | | | | | | |
| | Entry Segment NULL | 44 | F | F | F | F | F | F | F | F |
| | Instruct Flag | 59 | F | F | F | F | F | F | F | F |
| | Entry Drivable | 61 | T | T | T | T | T | T | T | T |
| Exit Segment | Street | 13 | T | T | F | F | T | F | T | |
| | Ramp | # | F | F | T | T | F | F | T | |
| | Controlled Access | 15 | F | F | F | T | F | T | | |
| | Frontage | 16 | | | | | | | | |
| | Boat Ferry | 17 | F | F | F | F | F | F | F | |
| | Rail Ferry | 18 | F | F | F | F | F | F | F | |
| | Roundabout | 19 | | | | | | | | |
| | Same segment as entry | 20 | | F | | | | | | |
| | Same name as entry | 21 | T | T | T | T | F | F | | |
| | Exit Drivable | 62 | T | T | T | T | T | T | T | T |
| Accessible Segments (excluding exit segment) | None | 22 | | F | F | | F | F | | |
| | Only One | 23 | | | | | | | | |
| | One or more close to exit segm | 24 | | | | F | | F | | |
| | Rank less than entry | 25 | | | | | | | | |
| | None with same name as entry | 26 | | | | | | | | |
| | One or more IMI | 27 | | | | | | | | |
| | One or more Street | 28 | | | | | | | | |
| | One or more ramp | 29 | | | | | | | | |
| | One or more controlled access | 30 | | | | | | | | |
| Inaccessible Segments | None | 31 | | | | | | | | |
| | Same name as exit | 32 | | | | | | | | |
| Skipped Segments | None | 34 | | T | | | | | | |
| | One or more roundabout segme | 35 | F | F | F | F | F | F | F | |
| | One or more indescribables | 60 | F | F | F | F | F | F | F | T |
| | Return | | T | T | T | T | T | T | T | T |
| | Return As | | 4 | 5 | 14 | 23 | 6 | 24 | 37 | 62 |

| Maneuver | # | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| Uturn on street A | 10 | | | T | | | | | | F | F | | T | | | | F | F | F | | | | | | T | F | F | T | 10 |
| Uturn onto Street A at IMI | 48 | | T | | | F | T F | T | F F | F | F | | T | T | | | F | F | F | | | | | | T | F | F | T | 48 |
| Bear to go onto ramp from ca/street/ramp | 51 | T | F T | T | | | T | | F | F | F | | | T | | | F | F | F | | | | | | T | F | F | T | 51 |
| Bear to remain on street A | 1 | | T | T F | T F | F | T F | T | F T | F | F | | T | T | | | F | F | F | | | | | | T | F | F | T | 1 |
| Bear to remain on Controlled Access | 25 | | | T | | | T F | T | F T | F | F | | | T | T | F | F | F | F | | | | | | T | F | F | T | 25 |
| Bifurcation/Special Explication - Keep Left/Right | 61 | | | | | | T F | T | F F | F | F | F T | | T | | | | | | | | | | | T | F | F | T | 61 |
| Drive on RAB/STF; pass n roads before arriving (Start and Arrive on Roundabout) | 57 | | | | | | T T | T | F | F | F | | | T | | | | | | F T | | | | | T | F | F | T | 57 |
| Drive on RAB/STF; pass n roads before exiting (Start on a Roundabout) | 58 | | | | T | | T T | T | F | F | F | | | T | | | | | | F F | | | | | T | F | F | T | 58 |
| Turn to enter a RAB/STF; pass n roads before arriving (Arrive on a roundabout) | 59 | | | | T | | T | T | F | F | F | | | T | | | | | | F F | | | | | T | F | F | T | 59 |
| Turn to enter a RAB/STF; pass n roads before exiting | 43 | | | | | | T | T | F | F | F | | | T | | | | | | F | | | | | T | F | F | T | 43 |
| Entering a boat ferry | 44 | | | | | | T | T | T | F | F | | | T | | | | | | F | | | | F | T | F | F | T | 44 |
| Exiting a boat ferry | 45 | | | | | | T | T | F | F | F | | | T | | | | | | F | | | | | T | F | F | T | 45 |
| Entering a rail ferry | 46 | | | | | | T | T | F | F | T | | | T | | | | | | F T | | | | | T | F | F | T | 46 |
| Exiting a rail ferry | 47 | | | | | | T | T | F | F | F | | | T | | | | | | F | | | | | T | F | F | T | 47 |

**TABLE 2-
SAMPLE ADVISORY RULES
FOR MANEUVER GENERATOR**

|  | Advisor Type | Merge | One or more segs at node | Intermediate arriving waypoint | Destination Waypoint | Controlled Access | Bridge | Tunnel | Toll Road | Toll Booth | In Process | Restricted Road | Entry Segment NULL | Intermediate starting waypoint | Origin Waypoint | Controlled Access | Bridge | Tunnel | Toll Road | Toll Booth | InProcess | Entry Drivable | Same State as Entry | Same Country as Entry | Restricted Road | Same Name as Entry | Exit Segment NULL | Only One | Controlled Access | Same Name as Entry | High Speed Connector | Exit Drivable | Return | Return As |
|---|---|---|---|---|---|---|---|---|---|---|---|---|---|---|---|---|---|---|---|---|---|---|---|---|---|---|---|---|---|---|---|---|---|---|
| Test IDs: |  | 2 | 5 | 36 | 37 | 8 | 38 | 39 | 40 | 41 | 42 | 43 | 44 | 45 | 46 | 15 | 47 | 48 | 49 | 50 | 51 | 61 | 52 | 53 | 54 | 21 | 55 | 56 | 57 | 33 | 58 | 62 |  |  |
| Entering a toll road | 1 |  |  |  |  |  |  |  | T |  |  |  | F |  |  |  |  |  |  |  |  | T |  |  |  |  | F |  |  |  |  | T | T | 1 |
| Exiting a toll road | 2 |  |  |  |  |  |  |  | F |  |  |  | F |  |  |  |  |  | T |  |  | T |  |  |  |  | F |  |  |  |  | T | T | 2 |
| Entering a tunnel | 3 |  |  |  |  |  |  | T |  |  |  |  | F |  |  |  |  | F |  |  |  | T |  |  |  |  | F |  |  |  |  | T | T | 3 |
| Exiting a tunnel | 4 |  |  |  |  |  | F |  |  |  |  |  | F |  |  |  |  | T |  |  |  | T |  |  |  |  | F |  |  |  |  | T | T | 4 |
| Entering a bridge | 5 |  |  |  |  |  | T |  |  |  |  |  | F |  |  |  | F |  |  |  |  | T |  |  |  |  | F |  |  |  |  | T | T | 5 |
| Approaching a toll booth | 6 |  |  |  |  |  |  |  |  | T |  |  | F |  |  |  |  |  |  |  |  | T |  |  |  |  | F |  |  |  |  |  | T | 6 |
| Starting Advisory | 7 |  |  |  |  |  |  |  |  |  |  |  | T | T |  |  |  |  |  |  |  |  |  |  |  |  | F |  |  |  |  |  | T | 7 |
| Arriving Advisory | 8 |  |  |  | T |  |  |  |  |  |  |  | F |  |  |  |  |  |  |  |  |  |  |  |  |  | T |  |  |  |  | T | T | 8 |
| Starting Intermediate Waypoint | 9 |  |  |  |  |  |  |  |  |  |  |  | F |  | T |  |  |  |  |  |  |  |  |  |  |  | F |  |  |  |  | T | T | 9 |
| Arriving Intermediate Waypoint | 10 |  |  | T |  |  |  |  |  |  |  |  | F |  |  |  |  |  |  |  |  |  |  |  |  |  | T |  |  |  |  | T | T | 10 |
| Entering In-Process | 11 |  |  |  |  |  |  |  |  |  | F |  | F |  |  |  |  |  |  |  | T | F |  |  |  |  | F |  |  |  |  | T | T | 11 |
| Exiting In-Process | 12 |  |  |  |  |  |  |  |  |  | T |  | F |  |  |  |  |  |  |  | F |  |  |  |  |  | F |  |  |  |  | T | T | 12 |
| Entering a new state | 13 |  |  |  |  |  |  |  |  |  |  |  | F |  |  |  |  |  |  |  |  | T | F |  |  |  | F |  |  |  |  | T | T | 13 |
| Entering a new country | 14 |  |  |  |  |  |  |  |  |  |  |  | F |  |  |  |  |  |  |  |  | T |  | F |  |  | F |  |  |  |  | T | T | 14 |
| Entering a restricted road | 15 |  |  |  |  |  |  |  |  |  |  | T | F |  |  |  |  |  |  |  |  | T |  |  | T |  | F |  |  |  |  | T | T | 15 |
| Exiting a restricted road | 16 |  |  |  |  |  |  |  |  |  |  | F | F |  |  |  |  |  |  |  |  | T |  |  | F |  | F |  |  |  |  | T | T | 16 |
| CA merges with current CA | 17 |  |  |  |  | T |  |  |  |  |  |  |  |  |  | T |  |  |  |  |  | T |  |  |  |  |  | T | T |  | T | T | 17 |
| High speed ramp merges with current CA | 18 |  |  |  |  | T |  |  |  |  |  |  | F |  |  | T |  |  |  |  |  | T |  |  |  | T |  | T | F | F | T | T | 18 |
| Roads Merge | 19 | T |  |  |  |  |  |  |  |  |  |  |  |  |  |  |  |  |  |  |  |  |  |  |  |  | F |  |  |  |  | T | T | 19 |
| Name Change | 20 |  | F |  |  |  |  |  |  |  |  |  | F |  |  |  |  |  |  |  |  | F |  |  |  | F | F |  |  |  |  | T | T | 20 |
| Proceed to drivable | 21 |  |  |  |  |  |  |  |  |  |  |  |  |  |  |  |  |  |  |  |  | F |  |  |  |  |  |  |  |  |  | T | T | 21 |
| Walk To Destination | 22 |  |  |  |  |  |  |  |  |  |  |  |  |  |  |  |  |  |  |  |  | T |  |  |  |  |  |  |  |  |  | F | T | 22 |

TABLE 3-
SAMPLE RULES TABLE FOR TOKEN GENERATOR

| Maneuver Type | Case | Advisory | Tests (EXAMPLE) | Action | Success Path | Fail Path | Output (EXAMPLE) |
|---|---|---|---|---|---|---|---|
| -1 | 0 | 1 | -1 | Append | 1 | 1 | \Tyou will enter a Toll Road\r\n |
| -1 | 1 | 2 | -1 | Append | 2 | 2 | \tYou will exit a Toll Road\r\n |
| -1 | 2 | 3 | -1 | Append | 3 | 3 | \tYou will enter a Tunnel\r\n |
| -1 | 3 | 4 | -1 | Append | 4 | 4 | \tYou will exit a Tunnel\r\n |
| -1 | 4 | 5 | -1 | Append | 5 | 5 | \tYou will cross a bridge\r\n |
| -1 | 5 | 6 | -1 | Append | 6 | 6 | \tYou will approach a toll booth\r\n |
| -1 | 6 | 11 | -1 | Append | 7 | 7 | \tYou are entering In-Process Data\r\n |
| -1 | 7 | 12 | -1 | Append | 8 | 8 | \tYou are exiting In-Process Data\r\n |
| -1 | 8 | 13 | -1 | Append | 9 | 9 | \tYou are entering a new state\r\n |
| -1 | 9 | 14 | -1 | Append | 10 | 10 | \tYou are entering a new country\r\n |
| -1 | 10 | 15 | -1 | Append | 11 | 11 | \tEntering a restricted road\r\n |
| -1 | 11 | 16 | -1 | Append | 12 | 12 | \tExiting a restricted road\r\n |
| -1 | 12 | 17 | -1 | Append | 13 | 13 | \tControlled Access merges with current Controlled Access\r\n |
| -1 | 13 | 18 | -1 | Append | -1 | -1 | \tHigh speed ramp merges with current Controlled Access\r\n |
| -2 | 0 | -1 | TG_IS_INPROCESS_TESTCB | Append | -1 | -1 | {IP} |
| -3 | 0 | -1 | TG_DIST_TO_NEXT_MANEUVER_TESTCB | Append | -1 | -1 | \t[DRIVE]<DIST_TO_NEXT_MANEUVER:0%.1f>\r\n |
| -4 | 0 | -1 | -1 | Append | -1 | -1 | <PHRASE_NUMBER>) |
| 0 | 0 | 7 | TG_EXIT_HEADING_EXIST_TESTCB | Append | 1 | 4 | \t[START OFF] [HEADING] <CONTEXT_EXIT_HEADING> |
| 0 | 1 | 7 | TG_DEST_STRING_AVAIL_TESTCB | Append | 3 | 2 | [ON] <CONTEXT_DESTINATION_STRING> |
| 0 | 2 | 7 | TG_EXIT_NAMES_EXIST_TESTCB | Append | 3 | 3 | [ON] <EXIT_NAMES> |
| 0 | 3 | 7 | TG_HEADING_TOWARDS_EXISTS_TESTCB | Append | 14 | 14 | [TOWARDS] <CONTEXT_HEADING_TOWARDS> |
| 0 | 4 | 7 | -1 | Replace | 1 | 14 | \t[START OFF] |
| 0 | 14 | 7 | -1 | Append | -1 | 5 | \r\n |
| 0 | 5 | 8 | -1 | Append | 12 | 6 | \tYou have arrived |
| 0 | 12 | 8 | TG_ENTRY_NAMES_EXIST_TESTCB | Append | 15 | 18 | [ON] <ENTRY_NAMES> |
| 0 | 18 | 8 | -1 | Append | 15 | 15 | at your destination |
| 0 | 15 | 8 | -1 | Append | -1 | 6 | \r\n |
| 0 | 6 | 9 | TG_EXIT_HEADING_EXIST_TESTCB | Append | 7 | 10 | \t[START OFF] [HEADING] <CONTEXT_EXIT_HEADING> |

| | | | | | | | |
|---|---|---|---|---|---|---|---|
| 0 | 7 | 9 | TG_DEST_STRING_AVAIL_TESTCB | Append | 9 | 8 | [ON] <CONTEXT_DESTINATION_STRING> |
| 0 | 8 | 9 | TG_EXIT_NAMES_EXIST_TESTCB | Append | 9 | 9 | [ON] <EXIT_NAMES> |
| 0 | 9 | 9 | TG_HEADING_TOWARDS_EXISTS_TESTCB | Append | 16 | 16 | [TOWARDS] <CONTEXT_HEADING_TOWARDS> |
| 0 | 16 | 9 | -1 | Append | -1 | 11 | \r\n |
| 0 | 10 | 9 | -1 | Replace | 7 | 16 | \t[START OFF] |
| 0 | 11 | 10 | -1 | Append | 13 | -1 | \tYou have arrived at your via point |
| 0 | 13 | 10 | TG_ENTRY_NAMES_EXIST_TESTCB | Append | 17 | 17 | [ON] <ENTRY_NAMES> |
| 0 | 17 | 10 | -1 | Append | -1 | -1 | \r\n |
| 1 | 0 | -1 | -1 | Append | 1 | 4 | \t[BEAR] <CONTEXT_EXIT_RELATIVE_POS> |
| 1 | 1 | -1 | TG_DEST_STRING_AVAIL_TESTCB | Append | -1 | 2 | [TO] [REMAIN ON] <CONTEXT_DESTINATION_STRING>\r\n |
| 1 | 2 | -1 | TG_EXIT_NAMES_EXIST_TESTCB | Append | -1 | 3 | [TO] [REMAIN ON] <EXIT_NAMES>\r\n |
| 1 | 3 | -1 | TG_ENTRY_NAMES_EXIST_TESTCB | Append | -1 | 4 | [TO] [REMAIN ON] <ENTRY_NAMES>\r\n |
| 1 | 4 | -1 | -1 | Append | -1 | -1 | to remain on the same street\r\n |
| 2 | 0 | -1 | -1 | Append | 1 | 3 | \t[STAY STRAIGHT] |
| 2 | 1 | -1 | TG_DEST_STRING_AVAIL_TESTCB | Append | -1 | 2 | [TO GO ONTO] <CONTEXT_DESTINATION_STRING>\r\n |
| 2 | 2 | -1 | TG_EXIT_NAMES_EXIST_TESTCB | Append | -1 | 3 | [TO GO ONTO] <EXIT_NAMES>\r\n |
| 2 | 3 | -1 | -1 | Append | -1 | -1 | to go onto a different street\r\n |
| 3 | 0 | -1 | TG_ENTRY_NAMES_EXIST_TESTCB | Append | 1 | 3 | \t<ENTRY_NAMES> |
| 3 | 1 | -1 | TG_DEST_STRING_AVAIL_TESTCB | Append | -1 | 2 | [BECOMES] <CONTEXT_DESTINATION_STRING>\r\n |
| 3 | 2 | -1 | TG_EXIT_NAMES_EXIST_TESTCB | Append | -1 | 4 | [BECOMES] <EXIT_NAMES>\r\n |
| 3 | 3 | -1 | TG_DEST_STRING_AVAIL_TESTCB | Replace | -1 | 5 | \t[STREET] [BECOMES] <CONTEXT_DESTINATION_STRING>\r\n |
| 3 | 4 | -1 | TG_ENTRY_NAMES_EXIST_TESTCB | Replace | -1 | 5 | \t<ENTRY_NAMES> NAME CHANGES\r\n |
| 3 | 5 | -1 | -1 | Replace | -1 | -1 | \tStreet name changes\r\n |
| 4 | 0 | -1 | TG_TURN_ANGLE_TESTCB | Append | 2 | 1 | \t[MAKE A] <CONTEXT_TURN_ANGLE> |
| 4 | 1 | -1 | -1 | Replace | 2 | 5 | \tMAKE A TURN |
| 4 | 2 | -1 | TG_DEST_STRING_AVAIL_TESTCB | Append | -1 | 3 | [TO] [REMAIN ON] <CONTEXT_DESTINATION_STRING>\r\n |
| 4 | 3 | -1 | TG_EXIT_NAMES | Append | -1 | 4 | [TO] [REMAIN ON] |

| | | | _EXIST_TESTCB | | | | <EXIT_NAMES>\r\n |
|---|---|---|---|---|---|---|---|
| 4 | 4 | -1 | TG_ENTRY_NAMES_EXIST_TESTCB | Append | -1 | 5 | [TO] [REMAIN ON] <ENTRY_NAMES>\r\n |
| 4 | 5 | -1 | -1 | Append | -1 | -1 | to stay on street\r\n |
| 5 | 0 | -1 | TG_TURN_ANGLE_TESTCB | Append | 2 | 1 | \t[MAKE A] <CONTEXT_TURN_ANGLE> |
| 5 | 1 | -1 | -1 | Replace | 2 | 5 | \tMAKE A TURN |
| 5 | 2 | -1 | TG_DEST_STRING_AVAIL_TESTCB | Append | -1 | 3 | [TO] [REMAIN ON] <CONTEXT_DESTINATION_STRING>\r\n |
| 5 | 3 | -1 | TG_EXIT_NAMES_EXIST_TESTCB | Append | -1 | 4 | [TO] [REMAIN ON] <EXIT_NAMES>\r\n |
| 5 | 4 | -1 | TG_ENTRY_NAMES_EXIST_TESTCB | Append | -1 | 5 | [TO] [REMAIN ON] <ENTRY_NAMES>\r\n |
| 5 | 5 | -1 | -1 | Append | -1 | -1 | to stay on street\r\n |
| 6 | 0 | -1 | TG_TURN_ANGLE_TESTCB | Append | 2 | 1 | \t[MAKE A] <CONTEXT_TURN_ANGLE> |
| 6 | 1 | -1 | -1 | Replace | 2 | 4 | \tMAKE A TURN |
| 6 | 2 | -1 | TG_DEST_STRING_AVAIL_TESTCB | Append | -1 | 3 | [TO GO ONTO] <CONTEXT_DESTINATION_STRING>\r\n |
| 6 | 3 | -1 | TG_EXIT_NAMES_EXIST_TESTCB | Append | -1 | 4 | [TO GO ONTO] <EXIT_NAMES>\r\n |
| 6 | 4 | -1 | -1 | Append | -1 | -1 | to go onto street\r\n |
| 7 | 0 | -1 | TG_EXIT_RELATIVE_POS_TESTCB | Append | 2 | 1 | \t[BEAR] <CONTEXT_EXIT_RELATIVE_POS> |
| 7 | 1 | -1 | -1 | Replace | 2 | -1 | \tBranch at fork |
| 7 | 2 | -1 | TG_DEST_STRING_AVAIL_TESTCB | Append | -1 | 3 | [TO] [REMAIN ON] <CONTEXT_DESTINATION_STRING>\r\n |
| 7 | 3 | -1 | TG_EXIT_NAMES_EXIST_TESTCB | Append | -1 | 4 | [TO] [REMAIN ON] <EXIT_NAMES>\r\n |
| 7 | 4 | -1 | TG_ENTRY_NAMES_EXIST_TESTCB | Append | -1 | 5 | [TO] [REMAIN ON] <ENTRY_NAMES>\r\n |
| 7 | 5 | -1 | -1 | Append | -1 | 6 | [TO] [REMAIN ON] THE SAME STREET\r\n |
| 7 | 6 | -1 | -1 | Append | -1 | -1 | to stay on the same street\r\n |
| 8 | 0 | -1 | TG_EXIT_RELATIVE_POS_TESTCB | Append | 2 | 1 | \t[BEAR] <CONTEXT_EXIT_RELATIVE_POS> |
| 8 | 1 | -1 | -1 | Replace | 2 | -1 | \tBranch at fork |
| 8 | 2 | -1 | TG_DEST_STRING_AVAIL_TESTCB | Append | -1 | 3 | [TO GO ONTO] <CONTEXT_DESTINATION_STRING>\r\n |
| 8 | 3 | -1 | TG_EXIT_NAMES_EXIST_TESTCB | Append | -1 | 4 | [TO GO ONTO] <EXIT_NAMES>\r\n |
| 8 | 4 | -1 | -1 | Append | -1 | 6 | [TO GO ONTO] THE SAME STREET\r\n |
| 8 | 5 | -1 | -1 | Append | -1 | -1 | to stay onto a different street\r\n |
| 9 | 0 | -1 | TG_ENTRY_NAMES_EXIST_TESTCB | Append | 1 | 3 | \t<ENTRY_NAMES> |
| 9 | 1 | -1 | TG_DEST_STRING | Append | -1 | 2 | [WILL] [MERGE] [ONTO] |

| | | | G_AVAIL_TESTCB | | | | <CONTEXT_DESTINATION_STRING>\r\n |
|---|---|---|---|---|---|---|---|
| 9 | 2 | -1 | TG_EXIT_NAMES_EXIST_TESTCB | Append | -1 | 4 | [WILL] [MERGE] [ONTO] <EXIT_NAMES>\r\n |
| 9 | 3 | -1 | -1 | Append | 1 | -1 | \tRoad |
| 9 | 4 | -1 | -1 | Append | -1 | -1 | Merges\r\n |
| 10 | 0 | -1 | -1 | Append | -1 | -1 | \t[MAKE A] [UTURN]\r\n |
| 11 | 0 | -1 | -1 | Append | -1 | -1 | \t[STAY STRAIGHT] [TO] [REMAIN ON] [RAMP]\r\n |
| 12 | 0 | -1 | -1 | Append | 1 | -1 | \t[STAY STRAIGHT] [TO GO ONTO] [RAMP] |
| 12 | 1 | -1 | TG_DEST_STRING_AVAIL_TESTCB | Append | 3 | 2 | <CONTEXT_DESTINATION_STRING> |
| 12 | 2 | -1 | TG_EXIT_NAMES_EXIST_TESTCB | Append | 3 | 3 | <EXIT_NAMES> |
| 12 | 3 | -1 | -1 | Append | -1 | -1 | \r\n |
| 13 | 0 | -1 | TG_ENTRY_NAMES_EXIST_TESTCB | Append | 1 | 3 | \t<ENTRY_NAMES> |
| 13 | 1 | -1 | TG_DEST_STRING_AVAIL_TESTCB | Append | -1 | 2 | [BECOMES] <CONTEXT_DESTINATION_STRING>\r\n |
| 13 | 2 | -1 | TG_EXIT_NAMES_EXIST_TESTCB | Append | -1 | 4 | [BECOMES] <EXIT_NAMES>\r\n |
| 13 | 3 | -1 | -1 | Replace | 4 | -1 | \tRoad |
| 13 | 4 | -1 | -1 | Append | -1 | -1 | name changes\r\n |
| 14 | 0 | -1 | TG_TURN_ANGLE_TESTCB | Append | -1 | 1 | \t[MAKE A] <CONTEXT_TURN_ANGLE> [TO] [REMAIN ON] [RAMP]\r\n |
| 14 | 1 | -1 | -1 | Append | -1 | -1 | \t[MAKE A] TURN [TO] [REMAIN ON] [RAMP]\r\n |
| 15 | 0 | -1 | TG_TURN_ANGLE_TESTCB | Append | 1 | 3 | \t[MAKE A] <CONTEXT_TURN_ANGLE> |
| 15 | 1 | -1 | TG_DEST_STRING_AVAIL_TESTCB | Append | -1 | 2 | [TO GO ONTO] [RAMP] <CONTEXT_DESTINATION_STRING>\r\n |
| 15 | 2 | -1 | TG_EXIT_NAMES_EXIST_TESTCB | Append | -1 | 4 | [TO GO ONTO] [RAMP] <EXIT_NAMES>\r\n |
| 15 | 3 | -1 | -1 | Replace | 1 | -1 | \tMake a turn |
| 15 | 4 | -1 | -1 | Append | -1 | -1 | to go onto Ramp\r\n |
| 16 | 0 | -1 | TG_EXIT_RELATIVE_POS_TESTCB | Append | 1 | 4 | \t[BEAR] <CONTEXT_EXIT_RELATIVE_POS> [TO] [REMAIN ON] [RAMP] |
| 16 | 1 | -1 | TG_EXIT_NAMES_EXIST_TESTCB | Append | -1 | 2 | <EXIT_NAMES>\r\n |
| 16 | 2 | -1 | TG_ENTRY_NAMES_EXIST_TESTCB | Append | -1 | 3 | <ENTRY_NAMES>\r\n |
| 16 | 3 | -1 | -1 | Append | -1 | -1 | \r\n |
| 16 | 4 | -1 | -1 | Replace | 1 | -1 | \tBranch at fork [TO] [REMAIN ON] [RAMP] |
| 17 | 0 | -1 | TG_EXIT_RELATIVE_POS_TESTCB | Append | 1 | 3 | \t[BEAR] <CONTEXT_EXIT_RELATIVE_POS> |
| 17 | 1 | -1 | TG_DEST_STRING_AVAIL_TESTCB | Append | -1 | 2 | [TO GO ONTO] [RAMP] <CONTEXT_DESTINATION_STRING |

|    |   |    |                              |         |    |    |                                                              |
|----|---|----|------------------------------|---------|----|----|--------------------------------------------------------------|
|    |   |    |                              |         |    |    | >\r\n                                                        |
| 17 | 2 | -1 | TG_EXIT_NAMES_EXIST_TESTCB   | Append  | -1 | 4  | [TO GO ONTO] [RAMP] <EXIT_NAMES>\r\n                         |
| 17 | 3 | -1 | -1                           | Replace | 1  | 4  | \tBranch at fork                                             |
| 17 | 4 | -1 | -1                           | Append  | -1 | -1 | [TO GO ONTO] [RAMP]\r\n                                      |
| 18 | 0 | -1 | TG_DEST_STRING_AVAIL_TESTCB  | Append  | -1 | 1  | \t[RAMP] [WILL] [MERGE] [ONTO] [RAMP] <CONTEXT_DESTINATION_STRING>\r\n |
| 18 | 1 | -1 | TG_EXIT_NAMES_EXIST_TESTCB   | Append  | -1 | 2  | \t[RAMP] [WILL] [MERGE] [ONTO] [RAMP] <EXIT_NAMES>\r\n       |
| 18 | 2 | -1 | -1                           | Append  | -1 | -1 | \t[RAMP] [WILL] [MERGE] [ONTO] [RAMP]\r\n                    |
| 19 | 0 | -1 | -1                           | Append  | 1  | -1 | \t[STAY STRAIGHT]                                            |
| 19 | 1 | -1 | TG_DEST_STRING_AVAIL_TESTCB  | Append  | -1 | 2  | [TO] [REMAIN ON] <CONTEXT_DESTINATION_STRING>\r\n            |
| 19 | 2 | -1 | TG_EXIT_NAMES_EXIST_TESTCB   | Append  | -1 | 3  | [TO] [REMAIN ON] <EXIT_NAMES>\r\n                            |
| 19 | 3 | -1 | -1                           | Append  | -1 | -1 | [TO] [REMAIN ON] SAME ROAD\r\n                               |
| 20 | 0 | -1 | -1                           | Append  | 1  | -1 | \t[STAY STRAIGHT]                                            |
| 20 | 1 | -1 | TG_DEST_STRING_AVAIL_TESTCB  | Append  | -1 | 2  | [TO] [REMAIN ON] <CONTEXT_DESTINATION_STRING>\r\n            |
| 20 | 2 | -1 | TG_EXIT_NAMES_EXIST_TESTCB   | Append  | -1 | 3  | [TO] [REMAIN ON] <EXIT_NAMES>\r\n                            |
| 20 | 3 | -1 | -1                           | Append  | -1 | -1 | [TO] [REMAIN ON] SAME ROAD\r\n                               |
| 21 | 0 | -1 | -1                           | Append  | 1  | -1 | \t[STAY STRAIGHT]                                            |
| 21 | 1 | -1 | TG_DEST_STRING_AVAIL_TESTCB  | Append  | -1 | 2  | [TO GO ONTO] <CONTEXT_DESTINATION_STRING>\r\n                |
| 21 | 2 | -1 | TG_EXIT_NAMES_EXIST_TESTCB   | Append  | -1 | 3  | [TO GO ONTO] <EXIT_NAMES>\r\n                                |
| 21 | 3 | -1 | -1                           | Append  | -1 | -1 | [TO GO ONTO] ANOTHER STREET\r\n                              |
| 22 | 0 | -1 | TG_ENTRY_NAMES_EXIST_TESTCB  | Append  | 1  | 3  | \t<ENTRY_NAMES>                                               |
| 22 | 1 | -1 | TG_DEST_STRING_AVAIL_TESTCB  | Append  | -1 | 2  | [BECOMES] <CONTEXT_DESTINATION_STRING>\r\n                   |
| 22 | 2 | -1 | TG_EXIT_NAMES_EXIST_TESTCB   | Append  | -1 | 4  | [BECOMES] <EXIT_NAMES>\r\n                                   |
| 22 | 3 | -1 | -1                           | Replace | 1  | -1 | \tStreet                                                     |
| 22 | 4 | -1 | -1                           | Append  | -1 | -1 | name changes\r\n                                             |
| 23 | 0 | -1 | TG_TURN_ANGLE_TESTCB         | Append  | 1  | 3  | \t[MAKE A] <CONTEXT_TURN_ANGLE>                              |
| 23 | 1 | -1 | TG_DEST_STRING_AVAIL_TESTCB  | Append  | -1 | 2  | [TO] [REMAIN ON] <CONTEXT_DESTINATION_STRING>\r\n            |
| 23 | 2 | -1 | TG_EXIT_NAMES_EXIST_TESTCB   | Append  | -1 | 4  | [TO] [REMAIN ON] <EXIT_NAMES>\r\n                            |
| 23 | 3 | -1 | -1                           | Replace | 1  | -1 | \t[MAKE A] TURN                                              |
| 23 | 4 | -1 | -1                           | Append  | -1 | -1 | [TO] [REMAIN ON] THE SAME STREET\r\n                         |

| 24 | 0 | -1 | TG_TURN_ANGLE_TESTCB | Append | 1 | 3 | \t[MAKE A] <CONTEXT_TURN_ANGLE> |
|---|---|---|---|---|---|---|---|
| 24 | 1 | -1 | TG_DEST_STRING_AVAIL_TESTCB | Append | -1 | 2 | [TO GO ONTO] <CONTEXT_DESTINATION_STRING>\r\n |
| 24 | 2 | -1 | TG_EXIT_NAMES_EXIST_TESTCB | Append | -1 | 4 | [TO GO ONTO] <EXIT_NAMES>\r\n |
| 24 | 3 | -1 | -1 | Replace | 1 | -1 | \t[MAKE A] TURN |
| 24 | 4 | -1 | -1 | Append | -1 | -1 | [TO GO ONTO] STREET\r\n |
| 25 | 0 | -1 | TG_EXIT_RELATIVE_POS_TESTCB | Append | 1 | 3 | \t[BEAR] <CONTEXT_EXIT_RELATIVE_POS> |
| 25 | 1 | -1 | TG_DEST_STRING_AVAIL_TESTCB | Append | -1 | 2 | [TO] [REMAIN ON] <CONTEXT_DESTINATION_STRING>\r\n |
| 25 | 2 | -1 | TG_EXIT_NAMES_EXIST_TESTCB | Append | -1 | 4 | [TO] [REMAIN ON] <EXIT_NAMES>\r\n |
| 25 | 3 | -1 | -1 | Append | 1 | -1 | \tBranch at fork |
| 25 | 4 | -1 | -1 | Append | -1 | -1 | [TO] [REMAIN ON] SAME ROAD\r\n |
| 26 | 0 | -1 | TG_EXIT_RELATIVE_POS_TESTCB | Append | 1 | 3 | \t[BEAR] <CONTEXT_EXIT_RELATIVE_POS> |
| 26 | 1 | -1 | TG_DEST_STRING_AVAIL_TESTCB | Append | -1 | 2 | [TO GO ONTO] <CONTEXT_DESTINATION_STRING>\r\n |
| 26 | 2 | -1 | TG_EXIT_NAMES_EXIST_TESTCB | Append | -1 | 4 | [TO GO ONTO] <EXIT_NAMES>\r\n |
| 26 | 3 | -1 | -1 | Append | 1 | -1 | \tBranch at fork |
| 26 | 4 | -1 | -1 | Append | -1 | -1 | [TO GO ONTO] A DIFFERENT ROAD\r\n |
| 27 | 0 | -1 | TG_ENTRY_NAMES_EXIST_TESTCB | Append | 1 | 3 | \t<ENTRY_NAMES> |
| 27 | 1 | -1 | TG_DEST_STRING_AVAIL_TESTCB | Append | -1 | 2 | [WILL] [MERGE] [ONTO] <CONTEXT_DESTINATION_STRING>\r\n |
| 27 | 2 | -1 | TG_EXIT_NAMES_EXIST_TESTCB | Append | -1 | 4 | [WILL] [MERGE] [ONTO] <EXIT_NAMES>\r\n |
| 27 | 3 | -1 | -1 | Replace | 1 | -1 | \tRoad |
| 27 | 4 | -1 | -1 | Append | -1 | -1 | [WILL] [MERGE] [ONTO] ANOTHER ROAD\r\n |
| 28 | 0 | -1 | TG_DEST_STRING_AVAIL_TESTCB | Append | -1 | 1 | \t[RAMP] [BECOMES] <CONTEXT_DESTINATION_STRING>\r\n |
| 28 | 1 | -1 | TG_EXIT_NAMES_EXIST_TESTCB | Append | -1 | 2 | \t[RAMP] [BECOMES] <EXIT_NAMES>\r\n |
| 28 | 2 | -1 | -1 | Replace | -1 | -1 | \t[RAMP] NAME CHANGES\r\n |
| 29 | 0 | -1 | TG_DEST_STRING_AVAIL_TESTCB | Append | -1 | 1 | \t[STAY STRAIGHT] [TO GO ONTO] <CONTEXT_DESTINATION_STRING>\r\n |
| 29 | 1 | -1 | TG_EXIT_NAMES_EXIST_TESTCB | Append | -1 | 2 | \t[STAY STRAIGHT] [TO GO ONTO] <EXIT_NAMES>\r\n |
| 29 | 2 | -1 | -1 | Replace | -1 | -1 | \t[STAY STRAIGHT] [TO GO ONTO] A STREET\r\n |
| 30 | 0 | -1 | TG_TURN_ANGLE_TESTCB | Append | 1 | 3 | \t[MAKE A] <CONTEXT_TURN_ANGLE> |
| 30 | 1 | -1 | TG_DEST_STRIN | Append | -1 | 2 | [TO GO ONTO] |

| | | | G_AVAIL_TESTCB | | | | <CONTEXT_DESTINATION_STRING>\r\n |
|---|---|---|---|---|---|---|---|
| 30 | 2 | -1 | TG_EXIT_NAMES_EXIST_TESTCB | Append | -1 | 4 | [TO GO ONTO] <EXIT_NAMES>\r\n |
| 30 | 3 | -1 | -1 | Replace | 1 | -1 | \t[MAKE A] TURN |
| 30 | 4 | -1 | -1 | Append | -1 | -1 | [TO GO ONTO] A STREET\r\n |
| 31 | 0 | -1 | TG_DEST_STRING_AVAIL_TESTCB | Append | -1 | 1 | \t[RAMP] [WILL] [MERGE] [ONTO] <CONTEXT_DESTINATION_STRING>\r\n |
| 31 | 1 | -1 | TG_EXIT_NAMES_EXIST_TESTCB | Append | -1 | 2 | \t[RAMP] [WILL] [MERGE] [ONTO] <EXIT_NAMES>\r\n |
| 31 | 2 | -1 | -1 | Replace | -1 | -1 | \t[RAMP] [WILL] [MERGE] [ONTO] STREET\r\n |
| 32 | 0 | -1 | TG_DEST_STRING_AVAIL_TESTCB | Append | -1 | 1 | \t[RAMP] [WILL] [MERGE] [ONTO] <CONTEXT_DESTINATION_STRING>\r\n |
| 32 | 1 | -1 | TG_EXIT_NAMES_EXIST_TESTCB | Append | -1 | 2 | \t[RAMP] [WILL] [MERGE] [ONTO] <EXIT_NAMES>\r\n |
| 32 | 2 | -1 | -1 | Replace | -1 | -1 | \t[RAMP] [WILL] [MERGE] [ONTO] STREET\r\n |
| 33 | 0 | -1 | TG_DEST_STRING_AVAIL_TESTCB | Append | -1 | 1 | \t[STREET] [BECOMES] [RAMP] <CONTEXT_DESTINATION_STRING>\r\n |
| 33 | 1 | -1 | TG_EXIT_NAMES_EXIST_TESTCB | Append | -1 | 2 | \t[STREET] [BECOMES] [RAMP] <EXIT_NAMES>\r\n |
| 33 | 2 | -1 | -1 | Replace | -1 | -1 | \t[STREET] [BECOMES] [RAMP] \r\n |
| 34 | 0 | -1 | TG_DEST_STRING_AVAIL_TESTCB | Append | -1 | 1 | \t[HIGHWAY] [BECOMES] [RAMP] <CONTEXT_DESTINATION_STRING>\r\n |
| 34 | 1 | -1 | TG_EXIT_NAMES_EXIST_TESTCB | Append | -1 | 2 | \t[HIGHWAY] [BECOMES] [RAMP] <EXIT_NAMES>\r\n |
| 34 | 2 | -1 | -1 | Replace | -1 | -1 | \t[HIGHWAY] [BECOMES] [RAMP]\r\n |
| 35 | 0 | -1 | TG_DEST_STRING_AVAIL_TESTCB | Append | -1 | 1 | \t[BEAR] <CONTEXT_EXIT_RELATIVE_POS> [TO GO ONTO] [RAMP] <CONTEXT_DESTINATION_STRING>\r\n |
| 35 | 1 | -1 | TG_EXIT_NAMES_EXIST_TESTCB | Append | -1 | 2 | \t[BEAR] <CONTEXT_EXIT_RELATIVE_POS> [TO GO ONTO] [RAMP] <EXIT_NAMES>\r\n |
| 35 | 2 | -1 | -1 | Replace | -1 | -1 | \t[BEAR] <CONTEXT_EXIT_RELATIVE_POS> [TO GO ONTO] [RAMP]\r\n |
| 36 | 0 | -1 | TG_EXIT_RELATIVE_POS_TESTCB | Append | 2 | 1 | \t[BEAR] <CONTEXT_EXIT_RELATIVE_POS> |
| 36 | 1 | -1 | -1 | Replace | 2 | -1 | \tBranch at fork |
| 36 | 2 | -1 | TG_DEST_STRING_AVAIL_TESTCB | Append | -1 | 3 | [TO GO ONTO] [RAMP] <CONTEXT_DESTINATION_STRING>\r\n |
| 36 | 3 | -1 | TG_EXIT_NAMES_EXIST_TESTCB | Append | -1 | 4 | [TO GO ONTO] [RAMP] <EXIT_NAMES>\r\n |
| 36 | 4 | -1 | -1 | Append | -1 | -1 | [TO GO ONTO] [RAMP]\r\n |
| 37 | 0 | -1 | TG_TURN_ANGLE_TESTCB | Append | 2 | 1 | \t[MAKE A] <CONTEXT_TURN_ANGLE> |
| 37 | 1 | -1 | -1 | Append | 2 | -1 | \t[MAKE A] TURN |

| 37 | 2 | -1 | TG_DEST_STRING_AVAIL_TESTCB | Append | -1 | 3 | [TO GO ONTO] [RAMP] <CONTEXT_DESTINATION_STRING>\r\n |
| --- | --- | --- | --- | --- | --- | --- | --- |
| 37 | 3 | -1 | TG_EXIT_NAMES_EXIST_TESTCB | Append | -1 | 4 | [TO GO ONTO] [RAMP] <EXIT_NAMES>\r\n |
| 37 | 4 | -1 | -1 | Append | -1 | -1 | [TO GO ONTO] [RAMP]\r\n |
| 38 | 0 | -1 | TG_DEST_STRING_AVAIL_TESTCB | Append | -1 | 1 | \t[RAMP] [BECOMES] <CONTEXT_DESTINATION_STRING>\r\n |
| 38 | 1 | -1 | TG_EXIT_NAMES_EXIST_TESTCB | Append | -1 | 2 | \t[RAMP] [BECOMES] <EXIT_NAMES>\r\n |
| 38 | 2 | -1 | -1 | Replace | -1 | -1 | \t[RAMP] [BECOMES] Controlled Access\r\n |
| 39 | 0 | -1 | TG_DEST_STRING_AVAIL_TESTCB | Append | -1 | 1 | \t[STAY STRAIGHT] [TO GO ONTO] <CONTEXT_DESTINATION_STRING>\r\n |
| 39 | 1 | -1 | TG_EXIT_NAMES_EXIST_TESTCB | Append | -1 | 2 | \t[STAY STRAIGHT] [TO GO ONTO] <EXIT_NAMES>\r\n |
| 39 | 2 | -1 | -1 | Replace | -1 | -1 | \t[STAY STRAIGHT] [TO GO ONTO] Controlled Access (from a ramp)\r\n |
| 40 | 0 | -1 | TG_DEST_STRING_AVAIL_TESTCB | Append | -1 | 1 | \t[STAY STRAIGHT] [TO GO ONTO] <CONTEXT_DESTINATION_STRING>\r\n |
| 40 | 1 | -1 | TG_EXIT_NAMES_EXIST_TESTCB | Append | -1 | 2 | \t[STAY STRAIGHT] [TO GO ONTO] <EXIT_NAMES>\r\n |
| 40 | 2 | -1 | -1 | Replace | -1 | -1 | \t[STAY STRAIGHT] [TO GO ONTO] Controlled Access (from a street)\r\n |
| 41 | 0 | -1 | TG_TURN_ANGLE_TESTCB | Append | 2 | 1 | \t[MAKE A] <CONTEXT_TURN_ANGLE> |
| 41 | 1 | -1 | -1 | Replace | 2 | -1 | \t[MAKE A] TURN |
| 41 | 2 | -1 | TG_DEST_STRING_AVAIL_TESTCB | Append | -1 | 3 | [TO GO ONTO] <CONTEXT_DESTINATION_STRING>\r\n |
| 41 | 3 | -1 | TG_EXIT_NAMES_EXIST_TESTCB | Append | -1 | 4 | [TO GO ONTO] <EXIT_NAMES>\r\n |
| 41 | 4 | -1 | -1 | Append | -1 | -1 | \t[TO GO ONTO] Controlled Access (from a ramp)\r\n |
| 42 | 0 | -1 | TG_DEST_STRING_AVAIL_TESTCB | Append | -1 | 1 | \t[RAMP] [WILL] [MERGE] [ONTO] <CONTEXT_DESTINATION_STRING>\r\n |
| 42 | 1 | -1 | TG_EXIT_NAMES_EXIST_TESTCB | Append | -1 | 2 | \t[RAMP] [WILL] [MERGE] [ONTO] <EXIT_NAMES>\r\n |
| 42 | 2 | -1 | -1 | Replace | -1 | -1 | \t[RAMP] [WILL] [MERGE] [ONTO] Controlled Access\r\n |
| 43 | 0 | -1 | TG_NUM_EXITS_ROUNDABOUT_TESTCB | Append | 2 | 1 | \t[ENTER] [THE ROUNDABOUT] [PASS] <CONTEXT_NUM_EXITS_ROUNDABOUT> [EXITS] |
| 43 | 1 | -1 | -1 | Append | 2 | 2 | \t[ENTER] [THE ROUNDABOUT] |
| 43 | 2 | -1 | TG_DEST_STRING_AVAIL_TESTCB | Append | -1 | 3 | [TO GO ONTO] <CONTEXT_DESTINATION_STRING>\r\n |
| 43 | 3 | -1 | TG_EXIT_NAMES_EXIST_TESTCB | Append | -1 | 4 | [TO GO ONTO] <EXIT_NAMES>\r\n |
| 43 | 4 | -1 | -1 | Append | -1 | -1 | [TO GO ONTO] STREET\r\n |
| 44 | 0 | -1 | TG_DEST_STRIN | Append | -1 | 1 | \t[YOU WILL] [ENTER] [THE FERRY |

| | | | G_AVAIL_TESTCB | | | | TERMINAL] [TO GO ONTO] <CONTEXT_DESTINATION_STRING>\r\n |
|---|---|---|---|---|---|---|---|
| 44 | 1 | -1 | TG_EXIT_NAMES _EXIST_TESTCB | Append | -1 | 2 | \t[YOU WILL] [ENTER] [THE FERRY TERMINAL] [TO GO ONTO] <EXIT_NAMES>\r\n |
| 44 | 2 | -1 | -1 | Replace | -1 | -1 | \t[YOU WILL] [ENTER] [THE FERRY TERMINAL]\r\n |
| 45 | 0 | -1 | -1 | Append | -1 | -1 | \t[YOU WILL] [EXIT] [THE FERRY TERMINAL]\r\n |
| 46 | 0 | -1 | TG_DEST_STRIN G_AVAIL_TESTCB | Append | -1 | 1 | \t[YOU WILL] [ENTER] [THE FERRY TERMINAL] [TO GO ONTO] <CONTEXT_DESTINATION_STRING>\r\n |
| 46 | 1 | -1 | TG_EXIT_NAMES _EXIST_TESTCB | Append | -1 | 2 | \t[YOU WILL] [ENTER] [THE FERRY TERMINAL] [TO GO ONTO] <EXIT_NAMES>\r\n |
| 46 | 2 | -1 | -1 | Replace | -1 | -1 | \t[YOU WILL] [ENTER] [THE FERRY TERMINAL]\r\n |
| 47 | 0 | -1 | -1 | Append | -1 | -1 | \t[YOU WILL] [EXIT] [THE FERRY TERMINAL]\r\n |
| 48 | 0 | -1 | -1 | Append | -1 | -1 | \t[MAKE A] [UTURN] [AT THE SPLIT]\r\n |
| 49 | 0 | -1 | TG_DEST_STRIN G_AVAIL_TESTCB | Append | -1 | 1 | \t[STAY STRAIGHT] [TO GO ONTO] [RAMP] <CONTEXT_DESTINATION_STRING>\r\n |
| 49 | 1 | -1 | TG_EXIT_NAMES _EXIST_TESTCB | Append | -1 | 2 | \t[STAY STRAIGHT] [TO GO ONTO] [RAMP] <EXIT_NAMES>\r\n |
| 49 | 2 | -1 | -1 | Replace | -1 | -1 | \t[STAY STRAIGHT] [TO GO ONTO] [RAMP]\r\n |
| 50 | 0 | -1 | TG_TURN_ANGLE _TESTCB | Append | 2 | 1 | \t[MAKE A] <CONTEXT_TURN_ANGLE> |
| 50 | 1 | -1 | -1 | Replace | 2 | -1 | \t[MAKE A] TURN |
| 50 | 2 | -1 | TG_DEST_STRIN G_AVAIL_TESTCB | Append | -1 | 3 | [TO GO ONTO] [RAMP] <CONTEXT_DESTINATION_STRING>\r\n |
| 50 | 3 | -1 | TG_EXIT_NAMES _EXIST_TESTCB | Append | -1 | 4 | [TO GO ONTO] [RAMP] <EXIT_NAMES>\r\n |
| 50 | 4 | -1 | -1 | Append | -1 | -1 | [TO GO ONTO] [RAMP]\r\n |
| 51 | 0 | -1 | TG_EXIT_RELATI VE_POS_TESTCB | Append | 2 | 1 | \t[BEAR] <CONTEXT_EXIT_RELATIVE_POS> |
| 51 | 1 | -1 | -1 | Replace | 2 | -1 | \t[BEAR] |
| 51 | 2 | -1 | TG_DEST_STRIN G_AVAIL_TESTCB | Append | -1 | 3 | [TO GO ONTO] [RAMP] <CONTEXT_DESTINATION_STRING>\r\n |
| 51 | 3 | -1 | TG_EXIT_NAMES _EXIST_TESTCB | Append | -1 | 4 | [TO GO ONTO] [RAMP] <EXIT_NAMES>\r\n |
| 51 | 4 | -1 | -1 | Append | -1 | -1 | [TO GO ONTO] [RAMP]\r\n |
| 52 | 0 | -1 | TG_TURN_ANGLE _TESTCB | Append | 2 | 1 | \t[MAKE A] <CONTEXT_TURN_ANGLE> |
| 52 | 1 | -1 | -1 | Replace | 2 | -1 | \t[MAKE A] TURN |
| 52 | 2 | -1 | TG_DEST_STRIN G_AVAIL_TESTCB | Append | -1 | 3 | [TO GO ONTO] [THE FRONTAGE ROAD] <CONTEXT_DESTINATION_STRING>\r\n |

| 52 | 3 | -1 | TG_EXIT_NAMES_EXIST_TESTCB | Append | -1 | 4 | [TO GO ONTO] [THE FRONTAGE ROAD] <EXIT_NAMES>\r\n |
|---|---|---|---|---|---|---|---|
| 52 | 4 | -1 | -1 | Append | -1 | -1 | [TO GO ONTO] [THE FRONTAGE ROAD]\r\n |
| 53 | 0 | -1 | TG_TURN_ANGLE_TESTCB | Append | 2 | 1 | \t[MAKE A] <CONTEXT_TURN_ANGLE> |
| 53 | 1 | -1 | -1 | Append | 2 | -1 | \t[MAKE A] TURN |
| 53 | 2 | -1 | TG_DEST_STRING_AVAIL_TESTCB | Append | -1 | 3 | [TO GO ONTO] <CONTEXT_DESTINATION_STRING>\r\n |
| 53 | 3 | -1 | TG_EXIT_NAMES_EXIST_TESTCB | Append | -1 | 4 | [TO GO ONTO] <EXIT_NAMES>\r\n |
| 53 | 4 | -1 | -1 | Append | -1 | -1 | [TO GO ONTO] STREET (from frontage road)\r\n |
| 54 | 0 | -1 | TG_TURN_ANGLE_TESTCB | Append | 2 | 1 | \t[MAKE A] <CONTEXT_TURN_ANGLE> |
| 54 | 1 | -1 | -1 | Replace | 2 | -1 | \t[MAKE A] TURN |
| 54 | 2 | -1 | TG_DEST_STRING_AVAIL_TESTCB | Append | -1 | 3 | [TO GO ONTO] [THE FRONTAGE ROAD] <CONTEXT_DESTINATION_STRING>\r\n |
| 54 | 3 | -1 | TG_EXIT_NAMES_EXIST_TESTCB | Append | -1 | 4 | [TO GO ONTO] [THE FRONTAGE ROAD] <EXIT_NAMES>\r\n |
| 54 | 4 | -1 | -1 | Append | -1 | -1 | [TO GO ONTO] [THE FRONTAGE ROAD]\r\n |
| 55 | 0 | -1 | TG_ENTRY_NAMES_EXIST_TESTCB | Append | 2 | 1 | \t[THE FRONTAGE ROAD] <ENTRY_NAMES> |
| 55 | 1 | -1 | -1 | Replace | 2 | -1 | \t[THE FRONTAGE ROAD] |
| 55 | 2 | -1 | TG_DEST_STRING_AVAIL_TESTCB | Append | -1 | 3 | [WILL] [MERGE] [ONTO] <CONTEXT_DESTINATION_STRING>\r\n |
| 55 | 3 | -1 | TG_EXIT_NAMES_EXIST_TESTCB | Append | -1 | 4 | [WILL] [MERGE] [ONTO] <EXIT_NAMES>\r\n |
| 55 | 4 | -1 | -1 | Append | -1 | -1 | [WILL] [MERGE] [ONTO] STREET\r\n |
| 56 | 0 | -1 | -1 | Append | 1 | 3 | \t[STAY STRAIGHT] |
| 56 | 1 | -1 | TG_DEST_STRING_AVAIL_TESTCB | Append | -1 | 2 | [TO GO ONTO] <CONTEXT_DESTINATION_STRING>\r\n |
| 56 | 2 | -1 | TG_EXIT_NAMES_EXIST_TESTCB | Append | -1 | 3 | [TO GO ONTO] <EXIT_NAMES>\r\n |
| 56 | 3 | -1 | -1 | Append | -1 | -1 | to go onto a different street\r\n |
| 57 | 0 | -1 | TG_NUM_EXITS_ROUNDABOUT_TESTCB | Append | 2 | 1 | \tDRIVE ON ROUNDABOUT [PASS] <CONTEXT_NUM_EXITS_ROUNDABOUT> [EXITS] |
| 57 | 1 | -1 | -1 | Append | 2 | 2 | \tDRIVE ON ROUNDABOUT |
| 57 | 2 | -1 | TG_DEST_STRING_AVAIL_TESTCB | Append | -1 | 3 | TO ARRIVE ON ROUNDABOUT (<CONTEXT_DESTINATION_STRING>)\r\n |
| 57 | 3 | -1 | TG_EXIT_NAMES_EXIST_TESTCB | Append | -1 | 4 | TO ARRIVE ON ROUNDABOUT (<EXIT_NAMES>)\r\n |
| 57 | 4 | -1 | -1 | Append | -1 | -1 | TO ARRIVE ON ROUNDABOUT\r\n |
| 58 | 0 | -1 | TG_NUM_EXITS_ROUNDABOUT_TESTCB | Append | 2 | 1 | \tDRIVE ON ROUNDABOUT [PASS] <CONTEXT_NUM_EXITS_ROUNDABOUT> [EXITS] |

| 58 | 1 | -1 | -1 | Append | 2 | 2 | \tDRIVE ON ROUNDABOUT |
|---|---|---|---|---|---|---|---|
| 58 | 2 | -1 | TG_DEST_STRIN G_AVAIL_TESTCB | Append | -1 | 3 | [TO GO ONTO] <CONTEXT_DESTINATION_STRING>\r\n |
| 58 | 3 | -1 | TG_EXIT_NAMES _EXIST_TESTCB | Append | -1 | 4 | [TO GO ONTO] <EXIT_NAMES>\r\n |
| 58 | 4 | -1 | -1 | Append | -1 | -1 | [TO GO ONTO] STREET\r\n |
| 59 | 0 | -1 | TG_NUM_EXITS_ ROUNDABOUT_T ESTCB | Append | 2 | 1 | \t[ENTER] [THE ROUNDABOUT] [PASS] <CONTEXT_NUM_EXITS_ROUNDAB OUT> [EXITS] |
| 59 | 1 | -1 | -1 | Append | 2 | 2 | \t[ENTER] [THE ROUNDABOUT] |
| 59 | 2 | -1 | TG_DEST_STRIN G_AVAIL_TESTCB | Append | -1 | 3 | TO ARRIVE ON ROUNDABOUT (<CONTEXT_DESTINATION_STRIN G>)\r\n |
| 59 | 3 | -1 | TG_EXIT_NAMES _EXIST_TESTCB | Append | -1 | 4 | TO ARRIVE ON ROUNDABOUT (<EXIT_NAMES>)\r\n |
| 59 | 4 | -1 | -1 | Append | -1 | -1 | TO ARRIVE ON ROUNDABOUT\r\n |
| 60 | 0 | -1 | TG_DEST_STRIN G_AVAIL_TESTCB | Append | -1 | 1 | \t[STAY STRAIGHT] [TO GO ONTO] <CONTEXT_DESTINATION_STRING>\r\n |
| 60 | 1 | -1 | TG_EXIT_NAMES _EXIST_TESTCB | Append | -1 | 2 | \t[STAY STRAIGHT] [TO GO ONTO] <EXIT_NAMES>\r\n |
| 60 | 2 | -1 | -1 | Replace | -1 | -1 | \t[STAY STRAIGHT] [TO GO ONTO] Street (from a Controlled Access)\r\n |
| 61 | 0 | -1 | TG_DEST_STRIN G_AVAIL_TESTCB | Append | -1 | 1 | \t[KEEP] <CONTEXT_EXIT_RELATIVE_POS> [TO GO ONTO] <CONTEXT_DESTINATION_STRING>\r\n |
| 61 | 1 | -1 | -1 | Append | -1 | -1 | \t[KEEP] <CONTEXT_EXIT_RELATIVE_POS>\r\n |
| 62 | 0 | -1 | TG_DEST_STRIN G_AVAIL_TESTCB | Append | -1 | 1 | \tTURN <CONTEXT_1ST_SKIPPED_RELPO S> TO GO <CONTEXT_TURN_ANGLE> ONTO <CONTEXT_DESTINATION_STRING>\r\n |
| 62 | 1 | -1 | -1 | Append | -1 | -1 | \tTURN <CONTEXT_1ST_SKIPPED_RELPO S> TO GO <CONTEXT_TURN_ANGLE>\r\n |

TABLE 4 -
SAMPLE (VOICE) RULES TABLE
FOR TOKEN GENERATOR

| Maneuver Type | Case | Advisory | Tests | Action | Success Path | Fail Path | Output |
|---|---|---|---|---|---|---|---|
| 0 | 0 | | 7 | -1 Append | -1 | 1 | [START OFF][HEADING]<CONTEXT_EXIT_HEADING>\r\n |
| 0 | 1 | | 8 | -1 Append | -1 | 2 | [YOU HAVE ARRIVED]\r\n |
| 0 | 2 | | 9 | -1 Append | -1 | 3 | [START OFF][HEADING]<CONTEXT_EXIT_HEADING>\r\n |
| 0 | 3 | | 10 | -1 Append | -1 | -1 | [YOU HAVE ARRIVED]\r\n |
| 1 | 0 | | -1 | -1 Append | -1 | -1 | [STAY STRAIGHT][TO][REMAIN ON][STREET]\r\n |
| 2 | 0 | | -1 | -1 Append | -1 | -1 | [STAY STRAIGHT][TO GO ONTO][STREET]\r\n |
| 3 | 0 | | -1 | -1 Append | -1 | -1 | [THE ROAD NAME WILL CHANGE]\r\n |
| 4 | 0 | | -1 | -1 Append | -1 | -1 | [MAKE A]<CONTEXT_TURN_ANGLE>[TO][REMAIN ON][STREET]\r\n |
| 5 | 0 | | -1 | -1 Append | -1 | -1 | [MAKE A]<CONTEXT_TURN_ANGLE>[TO][REMAIN ON][STREET]\r\n |
| 6 | 0 | | -1 | -1 Append | -1 | -1 | [MAKE A]<CONTEXT_TURN_ANGLE>[TO GO ONTO][STREET]\r\n |
| 7 | 0 | | -1 | -1 Append | -1 | -1 | [KEEP]<CONTEXT_EXIT_RELATIVE_POS>[TO][REMAIN ON][STREET]\r\n |
| 8 | 0 | | -1 | -1 Append | -1 | -1 | [KEEP]<CONTEXT_EXIT_RELATIVE_POS>[TO GO ONTO][STREET]\r\n |
| 9 | 0 | | -1 | -1 Append | -1 | -1 | [STREET][MERGE][ONTO][STREET]\r\n |
| 10 | 0 | | -1 | -1 Append | -1 | -1 | [MAKE A][UTURN]\r\n |
| 11 | 0 | | -1 | -1 Append | -1 | -1 | [STAY STRAIGHT][TO][REMAIN ON][RAMP]\r\n |
| 12 | 0 | | -1 | -1 Append | -1 | -1 | [STAY STRAIGHT][TO GO ONTO][RAMP]\r\n |
| 13 | 0 | | -1 | -1 Append | -1 | -1 | [THE ROAD NAME WILL CHANGE]\r\n |
| 14 | 0 | | -1 | -1 Append | -1 | -1 | [MAKE A]<CONTEXT_TURN_ANGLE>[TO][REMAIN ON][RAMP]\r\n |
| 15 | 0 | | -1 | -1 Append | -1 | -1 | [MAKE A]<CONTEXT_TURN_ANGLE>[TO GO ONTO][RAMP]\r\n |
| 16 | 0 | | -1 | -1 Append | -1 | -1 | [KEEP]<CONTEXT_EXIT_RELATIVE_POS>[TO][REMAIN ON][RAMP]\r\n |
| 17 | 0 | | -1 | -1 Append | -1 | -1 | [KEEP]<CONTEXT_EXIT_RELATIVE_POS>[TO GO ONTO][RAMP]\r\n |
| 18 | 0 | | -1 | -1 Append | -1 | -1 | [RAMP][MERGE][ONTO][RAMP]\r\n |
| 19 | 0 | | -1 | -1 Append | -1 | -1 | [STAY STRAIGHT][TO][REMAIN ON][HIGHWAY]\r\n |

- 57 -

| | | | | | |
|---|---|---|---|---|---|
| 20 | 0 | -1 | -1 Append | -1 | -1 [STAY STRAIGHT][TO][REMAIN ON][HIGHWAY]\r\n |
| 21 | 0 | -1 | -1 Append | -1 | -1 [STAY STRAIGHT][TO GO ONTO][HIGHWAY]\r\n |
| 22 | 0 | -1 | -1 Append | -1 | -1 [THE ROAD NAME WILL CHANGE]\r\n |
| 23 | 0 | -1 | -1 Append | -1 | -1 [MAKE A]<CONTEXT_TURN_ANGLE>[TO][REMAIN ON][HIGHWAY]\r\n |
| 24 | 0 | -1 | -1 Append | -1 | -1 [MAKE A]<CONTEXT_TURN_ANGLE>[TO GO ONTO][HIGHWAY]\r\n |
| 25 | 0 | -1 | -1 Append | -1 | -1 [KEEP]<CONTEXT_EXIT_RELATIVE_POS>[TO][REMAIN ON][HIGHWAY]\r\n |
| 26 | 0 | -1 | -1 Append | -1 | -1 [KEEP]<CONTEXT_EXIT_RELATIVE_POS>[TO GO ONTO]<CONTEXT_DESTINATION_STRING>\r\n |
| 27 | 0 | -1 | -1 Append | -1 | -1 [HIGHWAY][MERGE][ONTO][HIGHWAY]\r\n |
| 28 | 0 | -1 | -1 Append | -1 | -1 [RAMP][BECOMES][STREET]\r\n |
| 29 | 0 | -1 | -1 Append | -1 | -1 [STAY STRAIGHT][TO GO ONTO][STREET]\r\n |
| 30 | 0 | -1 | -1 Append | -1 | -1 [MAKE A]<CONTEXT_TURN_ANGLE>[TO GO ONTO][STREET]\r\n |
| 31 | 0 | -1 | -1 Append | -1 | -1 [RAMP][MERGE][ONTO][STREET]\r\n |
| 32 | 0 | -1 | -1 Append | -1 | -1 [RAMP][MERGE][ONTO][STREET]\r\n |
| 33 | 0 | -1 | -1 Append | -1 | -1 [STREET][BECOMES][RAMP]\r\n |
| 34 | 0 | -1 | -1 Append | -1 | -1 [HIGHWAY][BECOMES][RAMP]\r\n |
| 35 | 0 | -1 | -1 Append | -1 | -1 [STAY STRAIGHT][TO GO ONTO][RAMP]\r\n |
| 36 | 0 | -1 | -1 Append | -1 | -1 [KEEP]<CONTEXT_EXIT_RELATIVE_POS>[TO GO ONTO][RAMP]\r\n |
| 37 | 0 | -1 | -1 Append | -1 | -1 [MAKE A]<CONTEXT_TURN_ANGLE>[TO GO ONTO][RAMP]\r\n |
| 38 | 0 | -1 | -1 Append | -1 | -1 [RAMP][BECOMES][HIGHWAY]\r\n |
| 39 | 0 | -1 | -1 Append | -1 | -1 [STAY STRAIGHT][TO GO ONTO][HIGHWAY]\r\n |
| 40 | 0 | -1 | -1 Append | -1 | -1 [STAY STRAIGHT][TO GO ONTO][HIGHWAY]\r\n |
| 41 | 0 | -1 | -1 Append | -1 | -1 [MAKE A]<CONTEXT_TURN_ANGLE>[TO GO ONTO][HIGHWAY]\r\n |
| 42 | 0 | -1 | -1 Append | -1 | -1 [RAMP][MERGE][ONTO][HIGHWAY]\r\n |
| 43 | 0 | -1 | -1 Append | -1 | -1 [MAKE A]<CONTEXT_TURN_ANGLE>[TO ENTER][THE ROUNDABOUT][PASS]<CONTEXT_NUM_EXITS_ROUNDABOUT>[EXITS][BEFORE EXITING]\r\n |
| 44 | 0 | -1 | -1 Append | -1 | -1 [YOU WILL][ENTER][THE FERRY TERMINAL]\r\n |
| 45 | 0 | -1 | -1 Append | -1 | -1 [YOU WILL][EXIT][THE FERRY TERMINAL]\r\n |

| | | | | | | |
|---|---|---|---|---|---|---|
| 46 | 0 | -1 | -1 Append | -1 | -1 [YOU WILL][ENTER][THE FERRY TERMINAL]\r\n | |
| 47 | 0 | -1 | -1 Append | -1 | -1 [YOU WILL][EXIT][THE FERRY TERMINAL]\r\n | |
| 48 | 0 | -1 | -1 Append | -1 | -1 [MAKE A][UTURN][AT THE SPLIT]\r\n | |
| 49 | 0 | -1 | -1 Append | -1 | -1 [STAY STRAIGHT][TO GO ONTO][RAMP]\r\n | |
| 50 | 0 | -1 | -1 Append | -1 | -1 [MAKE A]<CONTEXT_TURN_ANGLE>[TO GO ONTO][RAMP]\r\n | |
| 51 | 0 | -1 | -1 Append | -1 | -1 [KEEP]<CONTEXT_EXIT_RELATIVE_POS>[TO GO ONTO][RAMP]\r\n | |
| 52 | 0 | -1 | -1 Append | -1 | -1 [MAKE A]<CONTEXT_TURN_ANGLE>[TO GO ONTO][THE FRONTAGE ROAD]\r\n | |
| 53 | 0 | -1 | -1 Append | -1 | -1 [MAKE A]<CONTEXT_TURN_ANGLE>[TO GO ONTO][STREET]\r\n | |
| 54 | 0 | -1 | -1 Append | -1 | -1 [MAKE A]<CONTEXT_TURN_ANGLE>[TO GO ONTO][THE FRONTAGE ROAD]\r\n | |
| 55 | 0 | -1 | -1 Append | -1 | -1 [THE FRONTAGE ROAD][MERGE][ONTO][STREET]\r\n | |
| -1 | 0 | 1 | -1 Append | 1 | 1 [YOU WILL][ENTER][A TOLL ROAD]\r\n | |
| -1 | 1 | 2 | -1 Append | 2 | 2 [YOU WILL][EXIT][A TOLL ROAD]\r\n | |
| -1 | 2 | 3 | -1 Append | 3 | 3 [YOU WILL][ENTER][A TUNNEL]\r\n | |
| -1 | 3 | 4 | -1 Append | 4 | 4 [YOU WILL][EXIT][A TUNNEL]\r\n | |
| -1 | 4 | 5 | -1 Append | 5 | 5 [YOU WILL CROSS][A BRIDGE]\r\n | |
| -1 | 5 | 6 | -1 Append | 6 | 6 [YOU WILL REACH][A TOLL BOOTH]\r\n | |
| -1 | 6 | 11 | -1 Append | 7 | 7 A | |
| -1 | 7 | 12 | -1 Append | 8 | 8 A | |
| -1 | 8 | 13 | -1 Append | 9 | 9 A | |
| -1 | 9 | 14 | -1 Append | -1 | -1 A | |

TABLE 5 -
(SAMPLE) SYMBOLS TABLE

| VISUAL DISPLAY | SYMBOL CODE | AUDIO PLAYBACK |
|---|---|---|
| A HALF | 85 | a half |
| A QUARTER | 86 | a quarter |
| AN EIGHTH OF A | 87 | an eight of a |
| A THIRD OF A | 88 | a third of a |
| ONE TENTH OF A | 89 | one tenth of a |
| TWO THIRDS OF A | 90 | two thirds of a |
| TWO TENTHS OF A | 91 | two tenths of a |
| THREE TENTHS OF A | 92 | three tenths of a |
| THREE QUARTERS OF A | 93 | three quarters of a |
| THE FIRST | 94 | the first |
| THE SECOND | 95 | the second |
| THE THIRD | 96 | the third |
| THE FOURTH | 97 | the fourth |
| THE FIFTH | 98 | the fifth |
| THE SIXTH | 99 | the sixth |
| THE SEVENTH | 100 | the seventh |
| THE EIGHTH | 101 | the eight |
| THE NINTH | 102 | the ninth |
| THE TENTH | 103 | the tenth |
| POINT | 104 | point |
| SOUND 1 | 105 | Sound 1 |
| SOUND 2 | 106 | Sound 2 |
| SOUND 3 | 107 | Sound 3 |
| SOUND 4 | 108 | Sound 4 |
| SOUND 5 | 109 | Sound 5 |
| SOUND 6 | 110 | Sound 6 |
| SOUND 7 | 111 | Sound 7 |
| RIGHT | 112 | right |
| RIGHT TURN | 113 | right turn |
| SLIGHT RIGHT | 114 | slight right |
| SLIGHT RIGHT TURN | 115 | slight right turn |
| HARD RIGHT | 116 | hard right |
| HARD RIGHT TURN | 117 | hard right turn |
| SHARP RIGHT | 118 | sharp right |
| SHARP RIGHT TURN | 119 | sharp right turn |
| LEFT | 120 | left |
| LEFT TURN | 121 | left turn |
| SLIGHT LEFT | 122 | slight left |
| SLIGHT LEFT TURN | 123 | slight left turn |
| HARD LEFT | 124 | hard left |
| HARD LEFT TURN | 125 | hard left turn |
| SHARP LEFT | 126 | sharp left |
| SHARP LEFT TURN | 127 | sharp left turn |

| | | |
|---|---|---|
| STAY STRAIGHT | 128 | stay straight |
| UTURN | 129 | U-turn |
| NORTH | 130 | north |
| SOUTH | 131 | south |
| EAST | 132 | east |
| WEST | 133 | west |
| NORTHEAST | 134 | north east |
| NORTHWEST | 135 | north west |
| SOUTHEAST | 136 | south east |
| SOUTHWEST | 137 | south west |
| KEEP LEFT | 138 | keep left |
| KEEP RIGHT | 139 | keep right |
| TO THE LEFT | 140 | to the left |
| TO THE RIGHT | 141 | to the right |
| ON THE LEFT | 142 | on the left |
| ON THE RIGHT | 143 | on the right |
| BRIDGE | 144 | bridge |
| BRIDGES | 145 | bridges |
| A BRIDGE | 146 | a bridge |
| THE BRIDGE | 147 | the bridge |
| DESTINATION | 148 | destination |
| THE DESTINATION | 149 | the destination |
| ENTRANCE | 150 | entrance |
| THE ENTRANCE | 151 | the entrance |
| EXIT | 152 | exit |
| EXITS | 153 | exits |
| THE EXIT | 154 | the exit |
| AN EXPRESSWAY | 155 | an expressway |
| EXPRESSWAY | 156 | expressway |
| THE EXPRESSWAY | 157 | the expressway |
| FERRY TERMINAL | 158 | ferry terminal |
| THE FERRY TERMINAL | 159 | the ferry terminal |
| A FREEWAY | 160 | a freeway |
| FREEWAY | 161 | freeway |
| THE FREEWAY | 162 | the freeway |
| FONTAGE ROAD | 163 | frontage road |
| THE FRONTAGE ROAD | 164 | the frontage road |
| SERVICE ROAD | 165 | service road |
| THE SERVICE ROAD | 166 | the service road |
| A HIGHWAY | 167 | a highway |
| HIGHWAY | 168 | highway |
| THE HIGHWAY | 169 | the highway |
| INTERSECTION | 170 | intersection |
| INTERSECTIONS | 171 | intersections |
| THE INTERSECTION | 172 | the intersection |
| THE LEFT LANE | 173 | the left lane |
| THE LOWER LEVEL | 174 | the lower level |
| THE MIDDLE LEVEL | 175 | the middle level |

| | | |
|---|---|---|
| OVERPASS | 176 | overpass |
| AN OVERPASS | 177 | an overpass |
| THE OVERPASS | 178 | the overpass |
| PIER | 179 | pier |
| A PIER | 180 | a pier |
| THE PIER | 181 | the pier |
| RAILWAY STATION | 182 | railway station |
| A RAILWAY STATION | 183 | a railway station |
| THE RAILWAY STATION | 184 | the railway station |
| RAMP | 185 | ramp |
| THE RAMP | 186 | the ramp |
| THE RIGHT LANE | 187 | the right lane |
| ROAD | 188 | road |
| ROUNDABOUT | 189 | roundabout |
| ROUNDABOUTS | 190 | roundabouts |
| A ROUNDABOUT | 191 | a roundabout |
| THE ROUNDABOUT | 192 | the roundabout |
| ROUTE | 193 | route |
| THE ROUTE | 194 | the route |
| STREET | 195 | street |
| THE STREET | 196 | the street |
| TOLL BOOTH | 197 | toll booth |
| A TOLL BOOTH | 198 | a toll booth |
| THE TOLL BOOTH | 199 | the toll booth |
| TOLL ROAD | 200 | toll road |
| A TOLL ROAD | 201 | a toll road |
| THE TOLL ROAD | 202 | the toll road |
| TUNNEL | 203 | tunnel |
| TUNNELS | 204 | tunnels |
| A TUNNEL | 205 | a tunnel |
| THE TUNNEL | 206 | the tunnel |
| UNDERPASS | 207 | underpass |
| AN UNDERPASS | 208 | an underpass |
| THE UNDERPASS | 209 | the underpass |
| THE UPPER LEVEL | 210 | the upper level |
| PARKING AREA | 211 | parking area |
| A PARKING AREA | 212 | a parking area |
| THE PARKING AREA | 213 | the parking area |
| SERVICE AREA | 214 | service area |
| A SERVICE AREA | 215 | a service area |
| THE SERVICE AREA | 216 | the service area |
| VIA POINT | 217 | via point |
| A VIA POINT | 218 | a via point |
| THE VIA POINT | 219 | the via point |
| RAILROAD | 220 | rail road |
| A RAILROAD | 221 | a rail road |
| THE RAILROAD | 222 | the rail road |
| A FEW | 223 | a few |

| | | |
|---|---|---|
| A SHORT DISTANCE | 224 | a short distance |
| AFTER | 225 | after |
| AHEAD | 226 | ahead |
| APPROACH | 227 | approach |
| APPROACHING | 228 | approaching |
| APPROXIMATELY | 229 | approximately |
| AS SOON AS POSSIBLE | 230 | as soon as possible |
| WHEN POSSIBLE | 231 | when possible |
| AND | 232 | and |
| AT | 233 | at |
| AT THE FORK | 234 | at the fork |
| AT THE INTERSECTION | 235 | at the intersection |
| AT YOUR DESTINATION | 236 | at your destination |
| AT THE BRANCH | 237 | at the branch |
| AT THE SPLIT | 238 | at the split |
| AT THE ROUNDABOUT | 239 | at the roundabout |
| ATTENTION | 240 | attention! |
| WILL BECOME | 241 | will become |
| BECOMES | 242 | becomes |
| BEFORE | 243 | before |
| BEFORE EXITING | 244 | before exiting |
| THE BRANCH | 245 | the branch |
| BRANCHES | 246 | branches |
| CROSS | 247 | cross |
| CROSS A BOUNDARY | 248 | cross a boundary |
| CROSS A BRIDGE | 249 | cross a bridge |
| DESTINATION AHEAD | 250 | destination ahead |
| DRIVING | 251 | driving |
| DRIVE THROUGH | 252 | drive through |
| DRIVE UNDERGROUND | 253 | drive underground |
| ENTER | 254 | enter |
| ENTER A TUNNEL | 255 | enter a tunnel |
| EXITS BEFORE EXITING | 256 | exits before exiting |
| FOLLOWED BY A | 257 | followed by a |
| FOLLOWED BY ANOTHER | 258 | followed by another |
| FOLLOWED CLOSELY BY A | 259 | followed closely by a |
| FOLLOWED CLOSELY BY ANOTHER | 260 | followed closely by another |
| HEADING | 261 | heading |
| THE HIGHLIGHTED ROUTE | 262 | the highlighted route |
| IN | 263 | in |
| IN A SHORT DISTANCE | 264 | in a short distance |
| IN APPROXIMATELY | 265 | in approximately |
| IN LESS THAN | 266 | in less than |
| IN MORE THAN | 267 | in more than |
| IN THE VICINITY OF | 268 | in the vicinity of |
| IS | 269 | is |
| KEEP | 270 | keep |
| LEGAL | 271 | legal |

| | | |
|---|---|---|
| LESS THAN | 272 | less than |
| MAKE A | 273 | make a |
| MANY | 274 | many |
| MERGE | 275 | merge |
| MERGING | 276 | merging |
| MOVE | 277 | move |
| MOVE TO | 278 | move to |
| NEAR | 279 | near |
| NEARING | 280 | nearing |
| NEXT | 281 | next |
| OFF THE ROUTE | 282 | off the route |
| ONTO | 283 | onto |
| ONTO THE RAMP | 284 | onto the ramp |
| PASS | 285 | pass |
| PASSING | 286 | passing |
| PLEASE | 287 | please |
| PREPARE TO | 288 | prepare to |
| PROCEED TO | 289 | proceed to |
| REMAIN ON | 290 | remain on |
| SEE | 291 | see |
| STAY ON | 292 | stay on |
| SOON | 293 | soon |
| START OFF | 294 | start off |
| SPLITS | 295 | splits |
| TAKE | 296 | take |
| THE CURRENT ROAD | 297 | the current road |
| THE ROAD NAME WILL CHANGE | 298 | the road name will change |
| THEN | 299 | then |
| TO | 300 | to |
| TO ENTER | 301 | to enter |
| TO EXIT | 302 | to exit |
| TO GO ONTO | 303 | to go onto |
| TO STAY ON | 304 | to stay on |
| TO CHANGE | 305 | to change |
| YOU ARE | 306 | you are |
| YOU HAVE ARRIVED | 307 | you have arrived |
| YOU WILL | 308 | you will |
| YOU WILL BE | 309 | you will be |
| YOU WILL CROSS | 310 | you will cross |
| YOU WILL REACH | 311 | you will reach |
| IN ABOUT | 312 | in about |
| THEN KEEP | 313 | then keep |
| TO_2 | 314 | to |
| FEET | 315 | feet |
| KILOMETER | 316 | kilometer |
| KILOMETERS | 317 | kilometers |
| METER | 318 | meter |
| METERS | 319 | meters |

| | | |
|---|---|---|
| MILE | 320 | mile |
| MILES | 321 | miles |
| NEARBY | 322 | nearby |
| YARDS | 323 | yards |
| AM | 324 | A.M. |
| PM | 325 | P.M. |
| HOUR | 326 | hour |
| HOURS | 327 | hours |
| MINUTE | 328 | minute |
| MINUTES | 329 | minutes |
| BAD WEATHER | 330 | bad weather |
| CONGESTION | 331 | congestion |
| CONSTRUCTION | 332 | construction |
| DELAY | 333 | delay |
| DETOUR | 334 | detour |
| LANE CLOSED | 335 | lane closed |
| ROAD CLOSED | 336 | road closed |
| CHANGING TO | 337 | changing to |
| CALCULATING | 338 | calculating |
| STARTING | 339 | starting |
| TERMINATING | 340 | terminating |
| ENDING | 341 | ending |
| ROUTE2 | 342 | route |
| DETOUR ROUTE | 343 | detour route |
| REROUTE | 344 | re-route |
| HEADUP | 345 | head-up |
| NORTHUP | 346 | north-up |
| 2D MAP | 347 | 2D map |
| 3D MAP | 348 | 3D map |
| DISPLAY | 349 | display |
| MODE | 350 | mode |
| GUIDANCE | 351 | guidance |
| MAP | 352 | map |
| GUIDANCE ENDS AT THIS POINT | 353 | guidance ends at this point |
| MANEUVER LIST | 354 | maneuver list |
| MANEUVER PREVIEW | 355 | maneuver preview |
| ROUTE PREVIEW | 356 | route preview |
| DEMONSTRATION | 357 | demonstration |
| SIMULATION | 358 | simulation |
| ORIGIN | 359 | origin |
| INTERMEDIATE | 360 | Intermediate |
| " | " | " |
| " | " | " |
| " | " | " |
| " | " | " |
| | | |
| | | |

We claim:

1. A method performed by a computer program as part of a computer-based system that provides route guidance and that uses a geographic database, comprising the steps of:

upon receiving an ordered plurality of data structures, each of which includes data from said geographic database for providing a maneuvering instruction at a location along a route, forming a token list comprised of an ordered sequence of tokens from which maneuvering instructions are provided, wherein a token is comprised of one of: a symbol that represents one or more words used in maneuvering instructions and a character string;

and wherein the step of forming a token list comprises:
applying a rules set to each of said ordered plurality of data structures;
providing an output list for each data structure based upon said applying of said rules set;
forming a token sequence from each output list; and
combining the token sequences formed from each output list to form the token list
whereby for each token in said token list that comprises a symbol, the computer-based system obtains data corresponding to the associated one or more words and uses the one or more words as part of a maneuvering instruction provided to a user.

2. The method of claim 1 wherein the step of forming a token sequence is further characterized by the steps of:

if the output list contains a key, expanding said key to form a token; and
including said token formed from said key in the token sequence formed for said output list,
wherein said key contains a value from the associated data structure for which the output list containing the key was formed.

3. A method performed by a computer program that is part of a computer-based navigation system that provides guidance to a user for following a route to a destination, wherein the route to the destination is formed of an ordered plurality of road segments, and
wherein the guidance comprises maneuvering instructions provided to the user at specific locations along said route, and further
wherein a maneuver generation component of said computer-based navigation system provides a plurality of maneuver data structures to said computer program,
wherein each of said plurality of maneuver data structures is associated with one of said specific locations and wherein each of said plurality of maneuver data structures contains data relating to the specific location associated therewith,
wherein the method performed by the computer program comprises:
receiving the plurality of maneuver data structures;
applying rules to each of said plurality of maneuver data structures to form a maneuver output that contains at least one of: a key, a symbol, and a character string, wherein a key is a reference to an item of data contained in the associated maneuver data structure and a symbol is a reference to a word phrase in a maneuvering instruction;
forming an ordered sequence of tokens from each maneuver output, wherein each ordered sequence of tokens contains at least one token and wherein a token comprises one of a symbol and a character string;
as each ordered sequence of tokens is formed, appending said ordered sequence of tokens to form a token list; and
providing said token list to an explication component of said computer-based navigation system,
whereby said explication component, for each of said tokens that comprises a symbol, retrieves data corresponding to the associated word phrase, whereby said data corresponding to the associated word phrase is used by a hardware component of said computer-based navigation system to present said word phrase to said user as part of said maneuvering instructions.

4. The method of claim 3 wherein the data corresponding to an associated word phrase comprise audio data.

5. The method of claim 4 wherein said explication component, for each uses a text-to-speech program to provide an audio data file for each of said tokens which is comprised of character string data; and wherein the method further comprises the step of:

providing each audio data file provided by said text-to-speech program along with said audio data associated with symbols according to the order of the token list.

6. The method of claim 3 wherein the data corresponding to an associated word phrase contain character text strings.

7. The method of claim 3 wherein the data corresponding to an associated word phrase contain character graphics data.

8. The method of claim 3 further comprising the steps of:

receiving a specification of a language in which the user want to have the maneuvering instructions presented;
selecting one set of rules from a plurality of available sets of rules, and wherein the one set of rules corresponds to the language in which the user wants to have the maneuvering instructions presented and at least another of the plurality of the sets of rules corresponds to a language other than the language in which the user wants to have the maneuvering instructions presented.

9. The method of claim 3 further comprising the step of:

expanding each key in a maneuver output to form a token which is included in said ordered sequence of tokens formed from each maneuver output.

10. The method of claim 9 wherein said expanding step comprises:

using a member value map that associates a value in said key with a symbol and including said symbol in said token formed from said key.

11. The method of claim 9 wherein said expanding step comprises:

identifying a style code associated with said key;
selecting one style format from a plurality of available style formats, wherein said one style format corresponds to the style code identified in said key;
forming a character string according to said one style format; and
including said character string in said token formed from said key.

12. The method of claim 9 wherein said expanding step comprises:

identifying a formatter code associated with said key;
forming a character string truncated to the formatter code; and
including said character string in said token formed from said key.

13. A computer program stored on a computer-readable medium and which is a part of a computer-based navigation system that provides guidance to a user for following a route to a destination, wherein the route to the destination is formed of an ordered plurality of road segments, and wherein the guidance comprises maneuvering instructions provided to the user at specific locations along said route, and further wherein a maneuver generation component of said computer-based navigation system provides a plurality of maneuver data structures to said computer program, wherein each of said plurality of maneuver data structures is associated with one of said specific locations and wherein each of said plurality of maneuver data structures contains data relating to the specific location associated therewith, wherein the computer program comprises:

a first routine that receives the plurality of maneuver data structures;

a second routine that applies rules to each of said plurality of maneuver data structures to form a maneuver output that contains at least one of: a key, a symbol, and a character string, wherein a key is a reference to an item of data contained in the associated maneuver data structure and a symbol is a reference to a word phrase in a maneuvering instruction;

a third routine that forms an ordered sequence of tokens from each maneuver output, wherein each ordered sequence of tokens contains at least one token and wherein a token comprises one of a symbol and a character string;

a fourth routine that appends said ordered sequence of tokens to form a token list as each ordered sequence of tokens is formed; and a fifth routine that provides said token list to an explication component of said computer-based navigation system, whereby said explication component, for each of said tokens that comprises a symbol, retrieves data corresponding to the associated word phrase, whereby said data corresponding to the associated word phrase is used by a hardware component of said computer-based navigation system to present said word phrase to said user as part of said maneuvering instructions.

14. The route guidance program of claim 13 wherein said rules comprise a first rules table and a second rules table, wherein said first rules table contains rules that provide a maneuver output for forming the token list with tokens which are suitable for explicating into maneuvering instructions provided visually, and wherein said second rules table contains rules that provide output lists for forming the first data object with tokens which are suitable for explicating into maneuvering instructions provided audibly.

15. The route guidance program of claim 13 wherein said rules comprise a first rules table and a second rules table, wherein said first rules table contains rules that provide a maneuver output for forming the token list with tokens which are suitable for explicating into maneuvering instructions in provided in English, and wherein said second rules table contains rules that provide a maneuver output for forming the token list with tokens which are suitable for explicating into maneuvering instructions provided in a language other than English.

16. The invention of claim 13 further comprising an expansion function that converts each key in said maneuver output to a character string.

17. The invention of claim 13 further comprising:

a member value map containing mappings of values in said maneuver data structures to symbols, and an expansion function coupled to receive keys in said maneuver output and use said member value map to add to said token list those symbols from said member value map identified as being mapped to the values in the corresponding keys in the maneuver output.

* * * * *